(12) United States Patent
Acharya et al.

(10) Patent No.: US 11,999,143 B2
(45) Date of Patent: Jun. 4, 2024

(54) FILM INCLUDING POLYMERIC ELEMENTS INTERCONNECTING PARTICLES

(71) Applicant: 3M INNOVATIVE PROPERTIES COMPANY, St. Paul, MN (US)

(72) Inventors: Bharat R. Acharya, Woodbury, MN (US); Derek J. Dehn, Maplewood, MN (US); Bradley L. Givot, St. Paul, MN (US); Jaewon Kim, Woodbury, MN (US); Yong K. Wu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 163 days.

(21) Appl. No.: 17/606,538

(22) PCT Filed: May 12, 2020

(86) PCT No.: PCT/IB2020/054484
§ 371 (c)(1),
(2) Date: Oct. 26, 2021

(87) PCT Pub. No.: WO2020/230024
PCT Pub. Date: Nov. 19, 2020

(65) Prior Publication Data
US 2022/0203661 A1 Jun. 30, 2022

Related U.S. Application Data

(60) Provisional application No. 62/848,287, filed on May 15, 2019.

(51) Int. Cl.
*B32B 27/18* (2006.01)
*B32B 5/12* (2006.01)
(Continued)

(52) U.S. Cl.
CPC ............... *B32B 27/18* (2013.01); *B32B 5/12* (2013.01); *B32B 5/16* (2013.01); *B32B 7/12* (2013.01);
(Continued)

(58) Field of Classification Search
CPC ........... B32B 2250/03; B32B 2250/24; B32B 2255/205; B32B 2255/28; B32B 2262/02;
(Continued)

(56) References Cited

U.S. PATENT DOCUMENTS 4,791,037 A  12/1988  Anderman
4,957,943 A   9/1990  McAllister
(Continued)

FOREIGN PATENT DOCUMENTS

JP      5893759    6/1983
JP     2001040330  2/2001
(Continued)

OTHER PUBLICATIONS

Chen, "Epoxy composites with glass bubbles for electrical application", 2013 IEEE Electrical Insulation Conference (EIC), Jun. 2013, pp. 20-24.
(Continued)

*Primary Examiner* — Lawrence D Ferguson
(74) *Attorney, Agent, or Firm* — Clifton F. Richardson

(57) ABSTRACT

A film includes a polymeric material and a plurality of particles dispersed therein. The polymeric material includes a plurality of elongate polymeric elements oriented along substantially a same first direction and interconnecting the particles. An elongate end portion of at least a first elongate polymeric element in the plurality of elongate polymeric elements conforms and is bonded to a first particle in the plurality of particles along an entire length of the elongate end portion. An elongate mid portion of at least a second (Continued)

elongate polymeric element in the plurality of elongate polymeric elements conforms and is bonded to a second particle in the plurality of particles along an entire length of the elongate mid portion with the second elongate polymeric element extending away from the second particle from opposite ends of the elongate mid portion. Multilayer films and processes are also described.

15 Claims, 12 Drawing Sheets

(51) Int. Cl.
    *B32B 5/16* (2006.01)
    *B32B 7/12* (2006.01)
    *B32B 27/08* (2006.01)
    *C08J 5/18* (2006.01)

(52) U.S. Cl.
    CPC ............... *B32B 27/08* (2013.01); *C08J 5/18* (2013.01); *B32B 2250/03* (2013.01); *B32B 2250/24* (2013.01); *B32B 2262/02* (2013.01); *B32B 2264/101* (2013.01); *B32B 2264/102* (2013.01); *B32B 2264/2032* (2020.08); *B32B 2264/303* (2020.08); *B32B 2264/403* (2020.08); *B32B 2307/204* (2013.01); *B32B 2307/54* (2013.01); *B32B 2307/706* (2013.01); *B32B 2605/00* (2013.01)

(58) Field of Classification Search
    CPC ........ B32B 2264/101; B32B 2264/102; B32B 2264/2032; B32B 2264/303; B32B 2264/403; B32B 2270/00; B32B 2307/10; B32B 2307/202; B32B 2307/204; B32B 2307/208; B32B 2307/302; B32B 2307/304; B32B 2307/54; B32B 2307/706; B32B 2605/00; B32B 27/08; B32B 27/18; B32B 27/22; B32B 27/28; B32B 27/281; B32B 27/285; B32B 27/286; B32B 27/302; B32B 27/304; B32B 27/308; B32B 27/32; B32B 27/322; B32B 27/34; B32B 27/36; B32B 27/365; B32B 27/40; B32B 3/26; B32B 5/12; B32B 5/16; B32B 7/12; C08J 2323/06; C08J 5/18
See application file for complete search history.

(56) References Cited

U.S. PATENT DOCUMENTS

| | | |
|---|---|---|
| 5,158,727 A | 10/1992 | Coleman-Kammula |
| 5,354,611 A | 10/1994 | Arthur |
| 5,525,663 A | 6/1996 | Oien |
| 5,567,757 A | 10/1996 | Szczepanski |
| 5,828,940 A | 10/1998 | Learman |
| 6,171,723 B1 | 1/2001 | Loch |
| 6,524,742 B1 | 2/2003 | Emanuel |
| 6,558,840 B1 | 5/2003 | Hikmet |
| 6,562,448 B1 | 5/2003 | Chamberlain |
| 8,917,220 B2 | 12/2014 | Ziolkowski |
| 9,006,302 B2 | 4/2015 | Amos |
| 9,249,283 B2 | 2/2016 | Heikkila |
| 9,382,407 B2 | 7/2016 | Park |
| 9,541,291 B2 | 1/2017 | Wolff |
| 10,836,873 B2 | 11/2020 | Dehn |
| 10,913,834 B2 | 2/2021 | Dehn |
| 10,927,228 B2 | 2/2021 | Acharya |
| 2002/0078793 A1 | 6/2002 | Holl |
| 2006/0118989 A1 | 6/2006 | Shinbach |
| 2006/0148915 A1 | 7/2006 | Floyd |
| 2007/0104943 A1 | 5/2007 | D'Souza |
| 2007/0116942 A1 | 5/2007 | D'Souza |
| 2007/0155858 A1 | 7/2007 | Israelson |
| 2009/0294729 A1 | 12/2009 | Harada |
| 2011/0259537 A1 | 10/2011 | Husband |
| 2014/0094076 A1 | 4/2014 | Mrozinski |
| 2014/0268625 A1 | 9/2014 | Sherrer |
| 2015/0099168 A1 | 4/2015 | Guo |
| 2015/0315071 A1 | 11/2015 | Amos |
| 2016/0326352 A1 | 11/2016 | Yalcin |

FOREIGN PATENT DOCUMENTS

| | | |
|---|---|---|
| JP | 2017057258 | 3/2017 |
| JP | 2017179061 | 10/2017 |
| WO | 2016153748 A1 | 9/2016 |
| WO | WO 2017-179474 | 10/2017 |
| WO | WO 2018-116127 | 6/2018 |
| WO | WO 2018-231687 | 12/2018 |
| WO | WO 2019-097445 | 5/2019 |
| WO | WO 2019-097446 | 5/2019 |
| WO | WO 2019-097447 | 5/2019 |
| WO | WO 2019-097449 | 5/2019 |
| WO | WO 2019-097451 | 5/2019 |
| WO | WO 2019-099603 | 5/2019 |

OTHER PUBLICATIONS

Hikmet, "New lithium-ion polymer battery concept for increased capacity", Journal of power Sources, Jan. 2001, vol. 92, No. 1-2, pp. 212-220.
International Search Report for PCT International Application No. PCT/IB2020/054484, dated Jul. 14, 2020, 4 pages.

FILM INCLUDING POLYMERIC ELEMENTS INTERCONNECTING PARTICLES

CROSS REFERENCE TO RELATED APPLICATIONS

This application is a national stage filing under 35 U.S.C. 371 of PCT/IB202020/054484, filed May 12, 2020, which claims the benefit of Provisional Application No. 62/848,287, filed May 15, 2019, the disclosures of which are incorporated by reference in their entirety herein.

BACKGROUND

A film may include particles dispersed in a polymer binder.

SUMMARY

In some aspects of the present description, a film including a polymeric material and a plurality of particles is described. The polymeric material includes a plurality of elongate polymeric elements having an anisotropic orientation distribution and interconnecting the particles.

In some aspects of the present description, a film including a polymeric material and a plurality of particles dispersed therein is provided. The polymeric material includes a plurality of elongate polymeric elements oriented along substantially a same first direction and interconnecting the particles. An elongate end portion of at least a first elongate polymeric element in the plurality of elongate polymeric elements conforms and is bonded to a first particle in the plurality of particles along an entire length of the elongate end portion. An elongate mid portion of at least a second elongate polymeric element in the plurality of elongate polymeric elements conforms and is bonded to a second particle in the plurality of particles along an entire length of the elongate mid portion with the second elongate polymeric element extending away from the second particle from opposite ends of the elongate mid portion.

In some aspects of the present description, a film including a polymeric material and a plurality of particles dispersed therein at a volume loading of greater than about 50 percent is provided. The polymeric material includes a plurality of elongate polymeric elements interconnecting the particles. Each elongate polymeric element in a sub-plurality of elongate polymeric elements in the plurality of elongate polymeric elements includes a plurality of spaced apart elongate portions. Each elongate portion in the plurality of spaced apart elongate portions conforms and is bonded to a particle in the plurality of particles along an entire length of the elongate portion with the polymeric element extending away from the particle from opposite ends of the elongate portion.

In some aspects of the present description, a multilayer film including a porous middle layer disposed between, and bonded to, opposing non-porous first and second protective layers is provided. The porous middle layer includes a plurality of elongate polymeric elements interconnecting a plurality of hollow particles, and a plurality of interconnected voids defined by the pluralities of elongate polymeric elements and hollow particles. A real part of a dielectric constant of the film at a frequency of about 2.5 GHz is less than about 1.4.

In some aspects of the present description, a multilayer film including a middle layer disposed between, and bonded to, opposing first and second protective layers is provided. The middle layer includes a plurality of elongate polymeric elements interconnecting a plurality of particles. For at least a pair of first and second particles in the plurality of particles and for each elongate polymeric element in a sub-plurality of elongate polymeric elements in the plurality of elongate polymeric elements, a first end of the element terminates at the first particle and an opposing second end of the element terminates at the second particle.

In some aspects of the present description, a multilayer film including a middle layer disposed between, and bonded to, opposing first and second layers is provided. The middle layer includes a plurality of hollow particles dispersed therein at a volume loading of greater than about 50 percent. The multilayer film has an elongation at break of at least 15% at a tensile load rate of no more than about 5 Newtons per second at room temperature. A bending of the multilayer film at a bend location over an inner radius of at most 1.5 mm results in no, or very little, damage to the middle layer at the bend location.

In some aspects of the present description, a process of making a film is provided. The process includes inducing a phase separation of a polymer from a component that is a solvent for the polymer at a higher temperature but not at a lower temperature such that the polymer forms a plurality of elongate polymeric elements having an anisotropic orientation distribution. In some embodiments, the film includes a plurality of particles and the plurality of elongate polymeric elements interconnect the particles.

In some aspects of the present description, a process for making a film is provided. The film includes a polymer and a plurality of particles dispersed therein at a volume loading of greater than about 50 percent. The process includes: providing a mixture at a first temperature, the mixture comprising the plurality of particles, the polymer, and a component that is a solvent for the polymer at a higher second temperature but not at a lower first temperature; disposing the mixture between first and second release surfaces; heating the mixture to the second temperature; applying a first pressure to the mixture; cooling the mixture to induce phase separation of the polymer from the component; and separating the mixture from at least one of the first and second release surfaces. For at least a first time interval prior to cooling the mixture, the mixture is under the first pressure at the second temperature. The first pressure is sufficiently high to cause the polymer to flow.

In some aspects of the present description, a process for making a film is provided. The film includes a polymer and a plurality of particles dispersed therein at a volume loading of greater than about 50 percent. The process includes: providing the plurality of particles, the polymer, and a component that is a solvent for the polymer at a higher second temperature but not at a lower first temperature; extruding the plurality of particles, the polymer, and the component at the second temperature into a stream; passing the stream through a nip; and cooling the stream to the first temperature to induce phase separation of the polymer from the component, the nip applying pressure to the stream before or during the phase separation.

In some aspects of the present description, a process for making a film is provided. The film includes a plurality of elongate polymeric elements interconnecting a plurality of particles. The process includes providing the plurality of particles, a polymer having a number average molecular weight greater than about $10^4$ g/mol, and a component that is a solvent for the polymer at a higher second temperature but not at a lower first temperature; forming a layer including the plurality of particles dispersed in of a miscible solution of the polymer and the component; and inducing a phase separation of the polymer from the component while the layer is under pressure such that the polymer forms the plurality of elongate polymeric elements.

DETAILED DESCRIPTION

Figure 1:
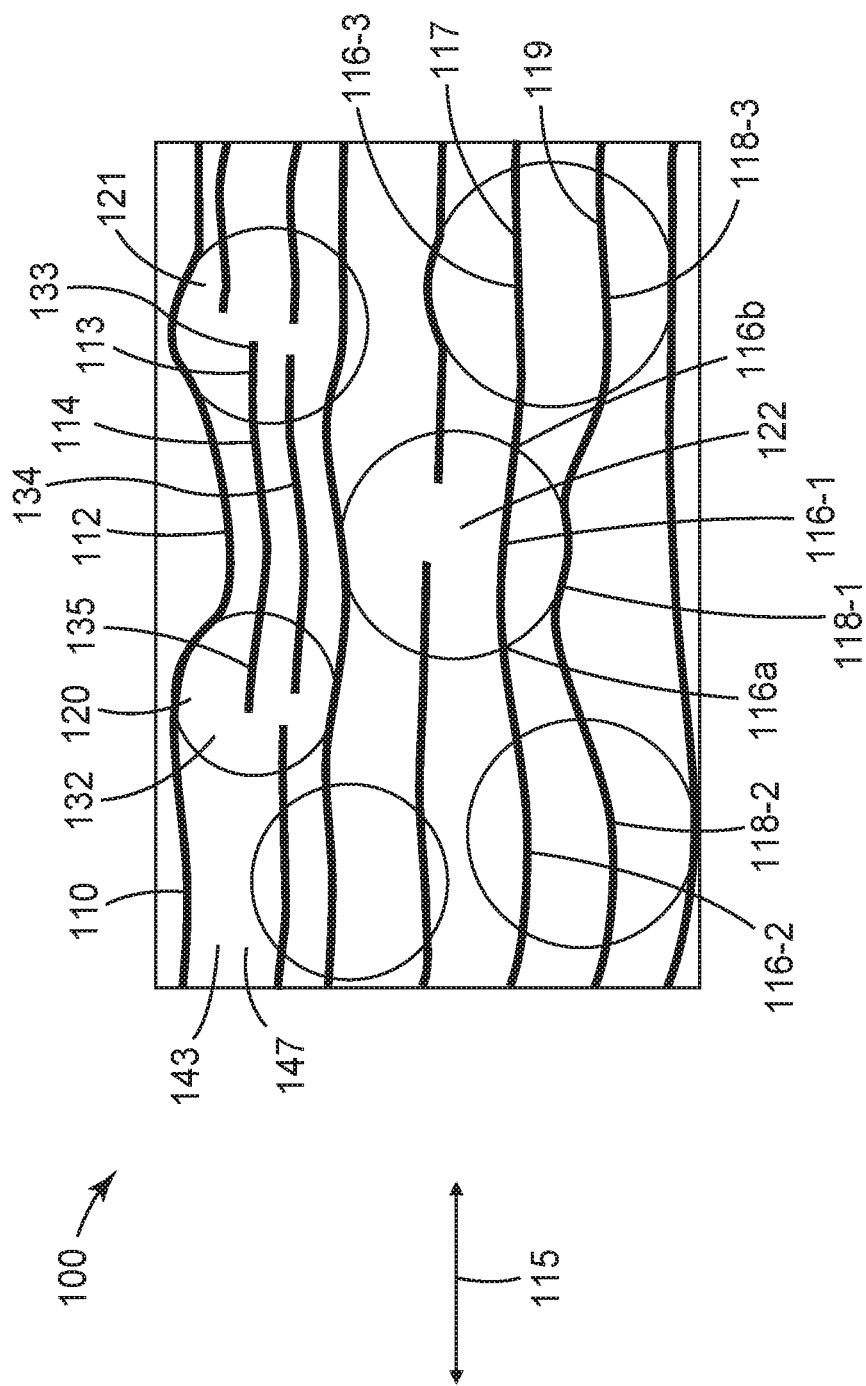
FIG. 1 is a schematic top view of a portion of a film.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

It may be desired to load a polymeric layer with a high loading of frangible (e.g., mechanically fragile) particles. For example, it may be desired to load a polymeric film with glass bubbles to reduce a dielectric constant of the film. However, glass bubbles or other frangible particles may not withstand the high pressures used with conventional film processes such as extrusion, for example. According to some embodiments, the processes described herein can be used to provide a high volume loading of glass bubbles or other frangible particles in a polymeric layer.

According to some embodiments, the processes described herein enable utilization of substantially all the available polymer to bind particles together thereby giving high strength to the resulting film. The particles may be frangible or other types of particles may be utilized depending on the desired application.

In some embodiments, the particles are hollow (e.g., glass bubbles) particles that have a low dielectric constant due to having a large volume fraction occupied by air, for example. In some embodiments, the resulting film has a low dielectric constant (e.g., real part of dielectric constant less than about 1.5, or less than about 1.4, or less than about 1.35 at a frequency of 2.5 GHz, or 9.5 GHz, or throughout a frequency range of 60 GHz to 90 GHz or 72 to 82 GHz, for example) and/or a low tan δ (e.g., less than about 0.005, or less than about 0.004, or less than about 0.003, or less than about 0.0025, or less than about 0.002 at a frequency of 2.5 GHz, or 9.5 GHz, or throughout a frequency range of 60 GHz to 90 GHz or 72 to 82 GHz, for example).

In some embodiments, a film of the present description is used to reduce transmission loss between an automotive RADAR unit and an exterior of the automobile, for example. In some cases, transmission loss between a radome and air and/or between air a bumper material occurs because of reflections due to the dielectric constant differences between the radome and air or between air and the bumper material. Such reflections can also result in undesired "ghost imaging". As shown in the Examples, the transmission loss can be reduced by using a film of the present description to provide a layer having a dielectric constant intermediate between that of air and typical materials used in a bumper, for example. In some embodiments, a bumper including a film described herein is provided. In some embodiments, a radome including a film described herein is provided.

"Miscible" as used herein refers to the ability of substances to mix in all proportions (i.e., to fully dissolve in each other at any concentration), forming a solution, where for some solvent-polymer systems heat may be needed for the polymer to be miscible with the solvent. By contrast, substances are immiscible if a significant proportion does not form a solution. For example, butanone is significantly soluble in water, but these two solvents are not miscible because they are not soluble in all proportions. In some cases, a component is a solvent for a polymer (i.e., the polymer is miscible with the component) at a higher temperature, but not at a lower temperature. At the higher temperature, the polymer and the component form a miscible polymer-solvent solution. When the temperature is lowered, the component is no longer a solvent for polymer and the polymer may then phase separate from the component to form a polymeric network. When a phase transformation is induced by a change in temperature, the phase separation can be referred to as a thermally induced phase separation (TIPS) process.

In the TIPS process, elevated temperature is used to make a nonsolvent become a solvent for the polymer, then the temperature is lowered returning the solvent to a nonsolvent for the polymer. The solvent used in the TIPS process can be volatile or nonvolatile. In some embodiments of the present description, a film or a layer in a multilayer film includes a polymeric material including plurality of elongate polymeric elements interconnecting a plurality of particles. The polymeric material and the plurality of particles may be referred to as a polymer matrix composite.

It has been found that in making a polymer matrix composite using the processes described herein, a slurry can be made with relatively high particle loadings and can be shaped into a layer that maintains its form as the solvent component is heated to become miscible with the polymer. The solvent used may be volatile and may be later evaporated.

In some embodiments, the processes described herein can allow for relatively high particle loading with processing into desired useful articles. Embodiments of relatively highly filled articles provided by embodiments of the method described herein can have relatively low binder contact with the filler particles, allowing for relatively highly porous articles. Such openness can significantly reduce the masking effect present in conventional particle bound systems, as well as facilitate relatively high surface-active particles or exposure of active particles in the porous article to liquids or gases. In some embodiments, this openness contributes to providing a low dielectric constant and a low dielectric loss (e.g., in some embodiments, the phase separated morphology of the polymeric material can result in a high volume fraction of air which has a substantially lower dielectric constant than the polymeric material).

Previous processes of making film utilizing TIPS may be categorized in two groups: active processes and passive processes. In the active processes, the particles, the binder polymer and its solvents are actively mixed at elevated temperature to dissolve the polymer (which may be provided as polymer particles) in its solvent and the blend is shaped in to desired form factor either by hot pressing the mixtures (e.g., at the lab scale) or by extruding through a heated die (e.g., at large or manufacturing scale). The hot film in its final form is quenched to a lower temperature at which the phase separation occurs. In the passive processes, the particles, the binder polymer, and the solvent for the binder polymer are mixed at room temperature and the slurry is first shaped in its desired form factor by coating either between two liners or by filling a predefined cavity and the film is cured in an oven to dissolve the polymer in the solvent. The hot film is then quenched to a lower temperature for the phase separation to occur.

The active processes allow uniform blending of polymer, allowing the polymer chains to substantially completely unravel thereby substantially fully utilizing available polymer. This process also allows direct feeding of raw materials to the extruder. However, this process has some significant limitations: first, only a few solvents with low vapor pressure (e.g., mineral oil) and/or high boiling point are suitable and thus solvent may need to be extracted from the film in a solvent extraction process. Second, the slurry with dissolved polymer is typically highly viscus and high pressure is typically needed to shape the slurry in to the desired form factor. Therefore, the active process is typically not suitable for use for frangible particles (e.g., glass bubbles) that are susceptible to mechanical pressure. A high pressure and shear applied during the extrusion process can lead to mechanical breaking of the particles or loss of desired properties due to strain induced during extrusion, for example.

The passive process allows use of high vapor pressure solvent and is amenable to multiple solvents that can readily be volatilized inside a solvent rated oven eliminating the need for a solvent extraction process. Since the polymer particles are not dissolved in the solvent, the slurry can be easily spread with small pressure. Therefore, this process can be used to process particles that are prone to mechanical damage during processing. However, since the polymer particles are not actively mixed or agitated in the solvent, a local concentration gradient may be created and the polymer particles may be not fully dissolved in the solvent. Moreover, since there is no active flow/mixing in the film, the polymer entanglement expected after quenching is typically not sufficient, leading to weaker films thereby limiting the amount of particles that can be loaded in the film.

According to the present description, processes to make films that takes advantages of both the active and passive approaches described above are provided. By applying (e.g., small) pressure after the polymer is dissolved in a coated film, the polymer can be forced to actively flow without damaging the particles and a robust film can be formed. In some embodiments, the processes described herein results in a plurality of elongate polymeric elements interconnecting a plurality of particles. In some embodiments, the resulting film includes a polymeric material and a plurality of particles dispersed therein at a volume loading of greater than about 50 percent, or greater than about 55%, or greater than about 60%, or greater than about 65% (e.g., the volume loading may be from about 50% to about 65%). This volume loading refers to the percent of the volume of the layer or film including the polymeric material that is occupied by the particles. Since a significant fraction of the volume of the layer or film can be occupied by air, the vol. % based on the volume of the particles and polymeric material (volume of particles divided by sum of volume of particles and volume of polymeric material times 100%) can be significantly higher than the volume loading of the particles in the polymeric material. In some embodiments, the volume ratio of particles to polymer (ratio of volume of the plurality of particles to volume of the polymeric material) is at least 5, or at least 10, or at least 20, or at least 30, or at least 40. In some such embodiments, the volume ratio of particles to polymer is no more than 100, or no more than 50, or no more than 40.

Typically, the maximum particle loading that can be achieved in traditional particle-filled composites (e.g., dense polymeric films and adhesives), is not more than about 40 to 60 vol. %, based on the volume of the particles and binder. Incorporating more than 60 vol. % particles into traditional particle-filled composites typically is not achievable because such highly particle-loaded materials typically cannot be processed via coating or extrusion methods and/or the resulting composite becomes very brittle. Conventional composites also typically fully encapsulate the particles with binder preventing access to the particle surfaces and minimizing potential particle-to-particle contact. Surprisingly, the high levels of solvent and the phase-separated morphologies, obtained with the methods described herein enable high particle loadings with low amounts of high molecular weight binder. The high particle loading also helps minimize the formation of thin non-porous polymer layers that can form during phase separation. Moreover, the polymer matrix composites described herein are relatively flexible, and tend not to shed particles.

Although not wanting to be bound by theory, it is believed that another advantage of embodiments of polymer matrix composites described herein for some applications, is that the particles are not fully coated with binder, enabling a high degree of particle surface contact without masking due to the porous nature of the binder. The porous nature of the composite matrix permits hydrodynamic flow or fast diffusion through the particles interstitial pores. Slower diffusive transport typically occurs through smaller pores of porous particle media. The high open surface area of retained particles reduces the slow diffusive transport effects helping to provide high resolution and separation capacity like what is typically found with depth filter media. The high molecular weight binder also does not readily flow in the absence of solvent, even at elevated temperatures (e.g., 135° C.) making steam sterilization possible. In some embodiments, the porous layer has a more uniform pore size distribution compared to conventional porous films.

In some embodiments, a film including a polymer matrix composite layer is used for its dielectric properties as described further elsewhere herein. In some embodiments, additional layers (e.g., protective layers) are included (e.g., for improved mechanical properties) without substantially affecting the dielectric properties of the polymer matrix composite layer.

In some embodiments, the polymeric material may include, consist essentially of, or consist of at least one thermoplastic polymer. Exemplary thermoplastic polymers include polyurethane, polyester (e.g., polyethylene terephthalate, polybutylene terephthalate, and polylactic acid), polyamide (e.g., nylon 6, nylon 6,6, and polypeptide), polyether (e.g., polyethylene oxide and polypropylene oxide), polycarbonate (e.g., bisphenol-A-polycarbonate), polyimide, polysulphone, polyethersulfone, polyphenylene oxide, polyacrylate (e.g., thermoplastic polymers formed from the addition polymerization of monomer(s) containing an acrylate functional group), polymethacrylate (e.g., thermoplastic polymers formed from the addition polymerization of monomer(s) containing a methacrylate functional group), polyolefin (e.g., polyethylene and polypropylene), styrene and styrene-based random and block copolymer, chlorinated polymer (e.g., polyvinyl chloride), fluorinated polymer (e.g., polyvinylidene fluoride; copolymers of tetrafluoroethylene, hexafluoropropylene and vinylidene fluoride; copolymers of ethylene, tetrafluoroethylene; hexafluoropropylene; and polytetrafluoroethylene), and copolymers of ethylene and chlorotrifluoroethylene. In some embodiments, thermoplastic polymers include homopolymers or copolymers (e.g., block copolymers or random copolymers). In some embodiments, thermoplastic polymers include a mixture of at least two thermoplastic polymer types (e.g., a mixture of polyethylene and polypropylene or a mixture of polyethylene and polyacrylate). In some embodiments, the polymer may be at least one of polyethylene (e.g., ultra-high molecular weight polyethylene), polypropylene (e.g., ultra-high molecular weight polypropylene), polylactic acid, poly (ethylene-co-chlorotrifluoroethylene) and polyvinylidene fluoride. In some embodiments, the thermoplastic polymer is a single thermoplastic polymer (i.e., it is not a mixture of at least two thermoplastic polymer types). In some embodiments, the thermoplastic polymers consist essentially of, or consist of polyethylene (e.g., ultra-high molecular weight polyethylene).

In some embodiments, the thermoplastic polymer used to make the films described herein is in the form of particles having a particle size less than 1000 (in some embodiments in the range from 1 to 10, 10 to 30, 30 to 100, 100 to 200, 200 to 500, 500 to 1000) micrometers.

In some embodiments, the polymeric material includes at least one of polyacrylonitrile, polyurethane, polyester, polyamide, polyether, polycarbonate, polyimide, polysulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.

In some embodiments, the film is formed using a polymer having a number average molecular weight greater than about $10^4$ g/mol. In some embodiments, the polymer or polymeric material forming elongate polymeric elements has a number average molecular weight in a range from $5 \times 10^4$ to $1 \times 10^7$ (in some embodiments, in a range from $1 \times 10^6$ to $8 \times 10^6$, $2 \times 10^6$ to $6 \times 10^6$, or even $3 \times 10^6$ to $5 \times 10^6$) g/mol. For purposes of the present description, the number average molecular weight can be measured by known techniques in the art (e.g., gel permeation chromatography (GPC)). GPC may be conducted in a suitable solvent for the thermoplastic polymer, along with the use of narrow molecular weight distribution polymer standards (e.g., narrow molecular weight distribution polystyrene standards). Thermoplastic polymers are generally characterized as being partially crystalline, exhibiting a melting point. In some embodiments, the thermoplastic polymer may have a melting point in a range from 120 to 350 (in some embodiments, in a range from 120 to 300, 120 to 250, or even 120 to 200) ° C. The melting point of the thermoplastic polymer can be measured by known techniques in the art (e.g., the on-set temperature measured in a differential scanning calorimetry (DSC) test, conducted with a 5 to 10 mg sample, at a heating scan rate of 10° C./min, while the sample is under a nitrogen atmosphere).

The solvent component (e.g., a component that is a solvent for the polymer for at least some temperatures) is selected such that it forms a miscible polymer-solvent solution. The solvent may be a blend of at least two individual solvents. In some embodiments, when the polymer is a polyolefin (e.g., at least one of polyethylene and polypropylene), the solvent may be, for example, at least one of mineral oil, tetralin, decalin, orthodichlorobenzene, cyclohexane-toluene mixture, dodecane, paraffin oil/wax, kerosene, isoparaffinic fluids, p-xylene/cyclohexane mixture (1/1 wt./wt.), camphene, 1,2,4 trichlorobenzene, octane, orange oil, vegetable oil, castor oil, or palm kernel oil. In some embodiments, when the polymer is polyvinylidene fluoride, the solvent may be, for example, at least one of ethylene carbonate, propylene carbonate, or 1,2,3 triacetoxypropane. The solvent may be removed, for example, by evaporation. High vapor pressure solvents being particularly suited to this method of removal. If, however, the first solvent has a low vapor pressure, it may be desirable to have a second solvent, of higher vapor pressure, to extract the first solvent, followed by evaporation of the second solvent. For example, in some embodiments, when mineral oil is used as a first solvent, isopropanol at elevated temperature (e.g., about 60° C.) or a blend of methyl nonafluorobutyl ether ($C_4F_9OCH_3$), ethylnonafluorobutyl ether ($C_4F_9OC_2H_5$), and trans-1,2-dichloroethylene (available, for example, under the trade designation "NOVEC 72DE" from 3M Company, St. Paul, Minn.) may be used as a second solvent to extract the first solvent, followed by evaporation of the second solvent. In some embodiments, when at least one of vegetable oil or palm kernel oil is used as the first solvent, isopropanol at elevated temperature (e.g., about 60° C.), may be used as the second solvent. In some embodiments, when ethylene carbonate is used as the first solvent, water may be used as the second solvent.

In some embodiments, small quantities of other additives can be added to the polymer matrix composite to impart additional functionality or act as processing aids. These include viscosity modifiers (e.g., fumed silica, block copolymers, and wax), plasticizers, thermal stabilizers (e.g., such as available, for example, under the trade designation "IRGANOX 1010" from BASF, Ludwigshafen, Germany), antimicrobials (e.g., silver and quaternary ammonium), flame retardants, antioxidants, dyes, pigments, and ultraviolet (UV) stabilizers.

Typically, the mixture or slurry is continuously mixed or blended to prevent or reduce settling or separation of the polymer and or particles from the solvent. In some embodiments, the slurry is degassed using techniques known in the art to remove entrapped air.

The slurry can be formed into an article (e.g., a film) using techniques known in the art, including knife coating, roll coating (e.g., roll coating through a defined nip), and coating through any number of different dies having the appropriate dimensions or profiles.

In some embodiments of the processes described herein, combining (e.g., mixing or blending the polymer, particles, and component (solvent at some temperatures)) is conducted at a temperature (e.g., a lower first temperature) below the melting point of the polymer and below the boiling point of the solvent.

In some embodiments of the processes described herein, the mixture (or slurry) is heated to a higher second temperature which is above the melting point of the miscible thermoplastic polymer-solvent solution, and below the boiling point of the solvent.

In some embodiments of the processes described herein, inducing phase separation is conducted at at least one temperature less than the melting point of the polymer in the slurry. Although not wanting to be bound by theory, it is believed that in some embodiments, solvents used to make a miscible blend with the polymer can cause melting point depression in the polymer. The melting point described herein includes any melting point depression of the polymer solvent system.

In some embodiments of the of the processes described herein, the film or layer including the polymeric material that includes a plurality of elongate polymeric elements structure may be formed during phase separation. In some embodiments, the polymeric material is provided by an induced phase separation of a miscible thermoplastic polymer-solvent solution. In some embodiments, the phase separation is induced thermally (e.g., via thermally induced phase separation (TIPS) by quenching to a lower temperature than used during heating). Cooling can be provided, for example, in air, liquid, or on a solid interface, and varied to control the phase separation. The polymeric material may form a network structure that may be inherently porous (i.e., have pores). The pore structure may be open, enabling fluid communication from an interior region of the film or layer to an exterior surface of the film or layer and/or between a first surface of the film or layer and an opposing second surface of the film or layer.

In some embodiments of the processes described herein, the weight ratio of solvent to polymer is at least 9:1. In some embodiments, the volume ratio of particles to polymer is at least 9:1. In some embodiments, and for ease of manufacturing, it may be desirable to form a layer at room temperature. Typically, during the layer formation using phase separation, relatively small pores are particularly vulnerable to collapsing during solvent extraction. The relatively high particle to polymer loading achievable by the methods described herein may reduce pore collapsing and yield a more uniform defect-free polymer matrix composite.

In some embodiments of the films described herein, the particles are present in a range from 1 to 99 (in some embodiments, in a range from 15 to 99, 25 to 98, 50 to 98, 75 to 98, or even 93 to 97), weight percent, based on the total weight of the polymer matrix composite (excluding any solvent), and may depend, for example, of the particular particles used.

The polymeric material may interconnect the particles to form a porous network structure. The polymeric material includes elongate polymeric elements such as polymer fibrils and may further include a plurality of interconnected morphologies that may include nodules, nodes, open cells, closed cells, leafy laces, strands, nodes, spheres, or honeycombs, for example. The polymeric structures may adhere directly to the surface of the particles and act as a binder for the particles. In this regard, the space between adjacent particles (e.g., particles or agglomerate particles) may include polymeric structures, as opposed to a solid matrix material, thereby providing desired porosity.

In some embodiments, the particles are dispersed within the polymeric material, such that an external surface of the individual units of the particles (e.g., individual particles or individual agglomerate particles) is mostly uncontacted, or uncoated, by the polymeric material. In this regard, in some embodiments, the average percent areal coverage of the polymeric material on the external surface of the individual particles (i.e., the percent of the external surface area that is in direct contact with the polymeric material) is not greater than 50 (in some embodiments, not greater than 40, 30, 25, 20, or even 10) percent, based on the total surface area of the external surfaces of the individual particles.

In some embodiments, the polymeric material does not penetrate internal porosity or internal surface area of the individual particles (e.g., individual particles or individual agglomerate particles) is mostly uncontacted, or uncoated, by the polymeric network structure.

Exemplary particles include hollow particles, acoustically active particles, soft magnetic particles, hard magnetic particles, thermally conductive particles, thermally insulating particles, intumescent particles, functional particles, dielectric particles, indicator particles, polar solvent soluble particles, polar solvent swellable particles, electrically conductive particles, or endothermic particles.

In some preferred embodiments, the particles are hollow particles which results in a low dielectric constant and/or low loss at a predetermined frequency or in a predetermined frequency range. In some embodiments, a multilayer film is provided that includes a middle layer disposed between opposing outer layers where the middle layer includes elongate polymeric elements interconnecting a plurality of particles. In some embodiments, the outer layers may be included to prevent particles from being lost from the middle layer when the film is subjected to abrasion, for example. In some embodiments, including the outer layers substantially improve the mechanical properties of the film.

FIG. 1 is a schematic top view of a portion of a film 100 which includes a polymeric material 110 and a plurality of particles 120 dispersed therein. The polymeric material 110 includes a plurality of elongate polymeric elements 112 oriented along substantially a same first direction 115 and interconnecting the particles 120, which may be hollow particles, for example.

In some embodiments, an elongate end portion 113 of at least a first elongate polymeric element 114 in the plurality of elongate polymeric elements 112 conforms and is bonded to a first particle 121 in the plurality of particles 120 along an entire length of the elongate end portion 113. In some embodiments, an elongate mid portion 116-1 of at least a second elongate polymeric element 117 in the plurality of elongate polymeric elements 112 conforms and is bonded to a second particle 122 in the plurality of particles 120 along an entire length of the elongate mid portion 116-1 with the second elongate polymeric element 117 extending away from the second particle 122 from opposite ends 116a, 116b of the elongate mid portion 116.

In some embodiments, each elongate polymeric element in a sub-plurality (e.g., 117, 119) of elongate polymeric elements in the plurality of elongate polymeric elements 112 includes a plurality of spaced apart elongate portions (e.g., elongate element 117 includes at least three spaced apart elongate portions 116-1, 116-2, and 116-3; and elongate element 119 includes at least three spaced apart elongate portions 118-1, 118-2, and 118-3). Each elongate portion (e.g., 116-1) in the plurality of spaced apart elongate portions conforms and is bonded to a particle (e.g., 122) in the plurality of particles 120 along an entire length of the elongate portion (e.g., 116-1) with the polymeric element extending away from the particle 122 from opposite ends (e.g., 116a, 116b) of the elongate portion (e.g., 116-1). In some embodiments, the sub-plurality of elongate polymeric elements includes at least 10%, or at least 20%, or at least 30%, or at least 40%, or at least 50% of the plurality of elongate polymeric elements 112. In some such embodiments, the sub-plurality of elongate polymeric elements includes no more than 80%, or no more than 70%, or no more than 60% of the plurality of elongate polymeric elements 112.

In some embodiments, for at least a pair of first and second particles 121 and 132 in the plurality of particles 120 and for each elongate polymeric element in a sub-plurality of elongate polymeric elements (114, 134) in the plurality of elongate polymeric elements 112, a first end 133 of the element terminates at the first particle 121 and an opposing second end 135 of the element terminates at the second particle 132. In some embodiments, the elongate polymeric elements in the sub-plurality of elongate polymeric elements are substantially parallel with each other (e.g., extending generally along a same first direction 115 but possibly undulating or otherwise having an orientation varying somewhat about the first direction 115). In some embodiments, the sub-plurality of elongate polymeric elements includes at least 10%, or at least 20%, or at least 30%, or at least 40%, or at least 50% of the plurality of elongate polymeric elements 112. In some such embodiments, the sub-plurality of elongate polymeric elements includes no more than 80%, or no more than 70%, or no more than 60% of the plurality of elongate polymeric elements 112.

Space between elongated polymeric elements 112 may be at least partially filled (e.g., filled) with a material 143 that may be air or that may be oil, for example. In some embodiments, the film 100 is made by providing plurality of particles 120, a polymer, and a component (e.g., an oil) that is a solvent for the polymer at a higher second temperature but not at a lower first temperature; and inducing a phase separation of the polymer from the component while the layer is under pressure such that the polymer forms the plurality of elongate polymeric elements 112. In some such embodiments, the material 143 is the component. In other embodiments, the component is removed and the material 143 is air or another material added into the spaces after the component has been removed.

In some embodiments, a plurality of interconnected voids 147 is defined by the pluralities of elongate polymeric elements 112 and particles 120, which may be hollow particles.

In some embodiments, the polymeric material 110 has a number average molecular weight greater than about $10^4$ g/mol, or in any of the ranges described elsewhere. In some embodiments, the polymer is or includes ultra-high molecular weight polyethylene (UHMWPE), for example. In some embodiments, the particles in the plurality of particles 120 are dispersed in the polymeric material 110 at a volume loading of greater than about 50 percent or in any of the ranges described elsewhere. In some embodiments, a ratio of a volume of the plurality of particles 120 to a volume of the polymeric material 110 is at least 4 or the ratio may be in any of the ranges described elsewhere.

In some embodiments, the plurality of elongate polymeric elements has an anisotropic distribution of orientation (e.g., the elongate polymeric elements in the film or layer may have a substantial directionality within a plane of the film or layer).

The polymeric material 110 includes a plurality of elongate polymeric elements 112 oriented along substantially a same first direction 115 (e.g., extending generally along the first direction 115 but possibly undulating or otherwise having an orientation varying somewhat about the first direction 115) and interconnecting the particles 120. In some embodiments, a portion of a film 100 which includes a polymeric material 110 and a plurality of particles 120 dispersed therein has dimensions substantially larger than an average center-to-center spacing between particles 120 (e.g., each of a length and a width of the portion may be at least 4, at least 6, or at least 10 times the average center-to-center spacing between particles 120). In some embodiments, the elongate polymeric elements in the portion extend substantially along a same first direction. In such cases, the film may be described as including polymeric material (the polymeric material in the portion) and a plurality of particles (the particles in the portion) dispersed therein, where the polymeric material includes a plurality of elongate polymeric elements oriented along substantially a same first direction and interconnecting the particles. In some embodiments, the elongate polymeric elements throughout the film extend substantially along a same first direction. In some embodiments, the elongate polymeric elements throughout the film extend substantially radially from a location (e.g., near the center) in the film.

In some embodiments, the film includes polymeric material extending between the elongate polymeric elements 112. This polymeric material may define polymeric elements extending laterally between the elongated polymeric elements. In some cases, this polymeric material includes morphologies such as leafy laces, strands, or meshes, for example. In some embodiments, the plurality of elongate polymeric elements and any polymeric material extending laterally between the elongated polymeric elements define a plurality of interconnected pores. The interconnected pores may be filled with oil (e.g., in embodiments where the solvent component is not removed) or may be filled with air (e.g., in embodiments where a low dielectric constant is desired).

In some embodiments, the elongate polymeric elements have a length substantially greater than a width. For example, in some embodiments, an elongate polymeric element has a length at least 2, 5, 10 or 20 times its average width. In some embodiments, the elongate polymeric elements are polymeric fibrils (e.g., polymer microfibrils). In some embodiments, individual elongate polymeric elements or individual polymer fibrils have an average width in a range from 10 nm to 100 nm (in some embodiments, in a range from 100 nm to 500 nm, or even 500 nm to 5 micrometers).

Figure 2:
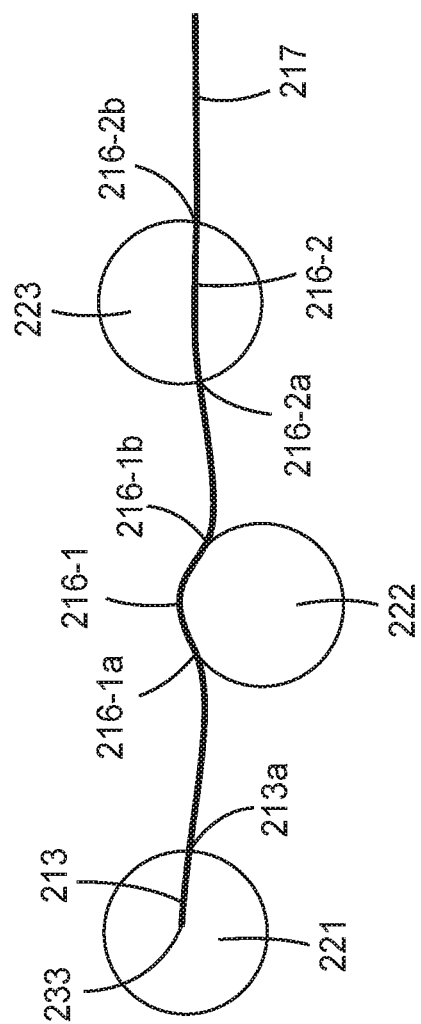
FIG. 2 is a schematic illustration of an elongate polymeric element interconnecting particles.

FIG. 2 is a schematic illustration of an elongate polymeric element 217 and particles 221, 222 and 223. In some embodiments, each elongate polymeric element 217 in at least a sub-plurality of elongate polymeric elements in the plurality of elongate polymeric elements extends at least from a first particle 221 in the plurality of particles to beyond a next nearest neighbor particle 223 of the first particle 221 along the elongate polymeric element 217. In the illustrated embodiment, the elongate polymeric element includes elongate portions 213, 216-1, and 216-2. Elongate portion 213 includes an end 233 of the elongate polymeric element 217. Elongate portion 213 conforms and is bonded to the first particle 221 along an entire length of the portion 213 between the end 233 and an opposite end 213a of the elongate portion 213. Elongate portion 216-1 conforms and is bonded to a nearest neighbor particle 222 of the first particle 221 along the elongate polymeric element 217. The polymeric element 217 extends away from the particle 222 from opposite ends 216-1a, 216-1b of the elongate portion 216-1. Similarly, elongate portion 216-2 conforms and is bonded to the next nearest neighbor particle 223 of the first particle 221 along the elongate polymeric element 217. The polymeric element 217 extends away from the particle 223 from opposite ends 216-2a, 216-2b of the elongate portion 216-2. The elongate portion 213 may be referred to as an elongate end portion and the elongate portions 216-1 and 216-2 may be referred to as elongate mid portions.

In the illustrated embodiment, the elongate polymeric element 217 extends from the first particle 221 in the plurality of particles to beyond a next nearest neighbor particle 223 of the first particle 221 along the elongate polymeric element 217. In other cases, the elongate portion 213 may not end on first particle 221 but may instead extend away from the particle first 221 from opposite ends of the elongate portion (see, e.g., elongate element 117 depicted in FIG. 1). In such cases, the elongate polymeric element 217 extends at least from the first particle 221 in the plurality of particles to beyond a next nearest neighbor particle 223 of the first particle 221 along the elongate polymeric element 217.

In some embodiments, the plurality of particles (e.g., plurality of particles 120) include hollow particles. For example, at least 50%, or at least 70%, or at least 90%, or all or substantially all of the particles 120 may be hollow. In some embodiments, the particles in the plurality of particles 120 are hollow. In some embodiments, the plurality of particles 120 includes frangible particles (e.g., hollow glass beads). In some such embodiments, the film 100 includes additional particles that are not hollow. In some embodiments, the hollow particles include hollow glass beads, hollow ceramic particles, or combinations thereof.

Figure 3:
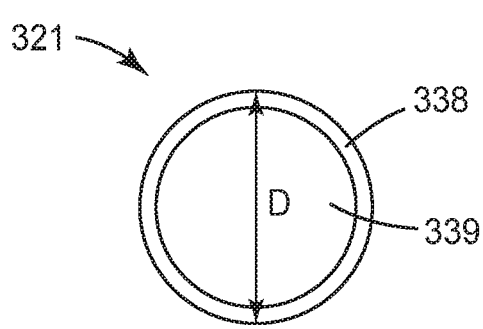
FIG. 3 is a schematic cross-sectional view of a hollow particle.

FIG. 3 is a schematic cross-sectional view of a hollow particle 321 including a shell 338 which may surround an air pocket 339, for example.

Particle 321 has a diameter D. In some embodiments, the particles in the plurality of particles are hollow and have an average size D greater than about 1 micron, or greater than about 5 microns, or greater than about 10 microns. In some embodiments, D is less than about 500 microns, or less than about 200 microns, or less than about 150 microns, or less than about 100 microns. The average size of the plurality of particles can be determined as the median diameter, $D_{50}$, as determined by particle size analysis, for example. In some embodiments, an average lateral spacing between elongated polymeric elements is less than the average size D, or less than 0.5 D, or less than 0.3 D, for example. In some such embodiments or in other embodiments, the average lateral spacing between elongated polymeric elements is at least 1.5 times, or at least 2 times, or at least 3 times an average width of the elongated polymeric elements. The particle size may be monodispersed or polydispersed. In some embodiments, the particles are spherical or substantially spherical. In other embodiments, particles having other shapes may be used.

Suitable particles include glass bubbles such as soda lime borosilicate glass particles. Suitable soda lime borosilicate glass bubbles include 3M Glass Bubbles S32HS and 3M Glass Bubbles K1, both available from 3M Company, St. Paul, Minn.

Figure 4:
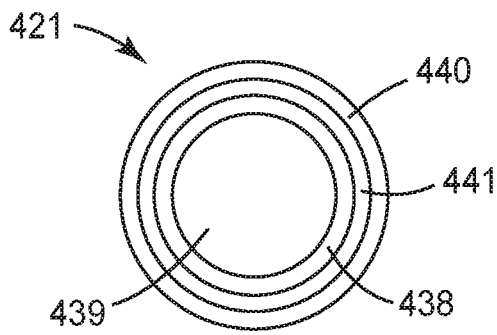
FIG. 4 is a schematic cross-sectional view of a coated hollow particle.

FIG. 4 is a schematic cross-sectional view of a hollow particle 421 including a shell 438 which may surround an air pocket 439, for example. A coating 440, 441 is applied to the shell 438. In the illustrated embodiment, the coating 440, 441 includes two coating layers 440 and 441. In other embodiments, a single coating layer is included. In still other embodiments, three or more coating layers are included. In some embodiments, at least a majority of the hollow particles include a coating 440, 441 at an outer surface of the hollow particles. In some embodiments, an outermost layer (e.g., layer 440) is a surface treatment layer applied to the particle. In some embodiments, the coating includes a metal layer (e.g., layer 441). The metal layer may include copper, aluminum, silver, tungsten, or combinations thereof, for example. In some embodiments, the coating further includes an inorganic insulating layer (e.g., layer 440) disposed on the metal layer (e.g., layer 441) at the outer surface. The insulating layer may be or include alumina, for example. In other embodiments, the particle 421 may be a solid particle which may be coated with one or more layers. A metal coating with an inorganic insulating coating may be included on a particle (hollow or solid) to alter dielectric properties a layer including the particles without making the layer electrically conductive, for example. Polymer matrix composites including dielectric particles are described, for example, in International Appl. Pub. No. WO 2019/099603 (Veeraraghavan et al.) and corresponding U.S. Prov. Appl. No. 62/587,045 filed Nov. 16, 2017 and titled "Polymer Matrix Composites Comprising Dielectric Particles and Methods of Making the Same".

In some embodiments, the particles include a surface treatment for improving adhesion to the polymer, for example. Suitable surface treatments include silane surface treatments. In some embodiments, the silane includes one or more functional groups, such as vinyl or alkyl groups, for example.

In some embodiments, the particles are hollow glass microspheres that are made from soda lime borosilicate, for example. In some embodiments, at least a portion of alkaline ions in the hollow particles can be extracted with acid, for example, to improve dielectric properties. For example, sodium or other alkaline metal ions tend to increase the permittivity and loss tangent of the particles. Acid extraction can be utilized to reduce the permittivity and/or the loss tangent of the particles and of the porous layer incorporating the particles. The acid extraction can be applied to the particles prior to incorporating them into the porous layer or the acid extraction can be applied to the porous layer including the particles since the porous nature of the layer allows the acid to reach the surface of the particles. In embodiments where the acid extraction is applied to the porous layer, the extract can be removed from the porous layer by a rinse process, for example.

Figure 5:
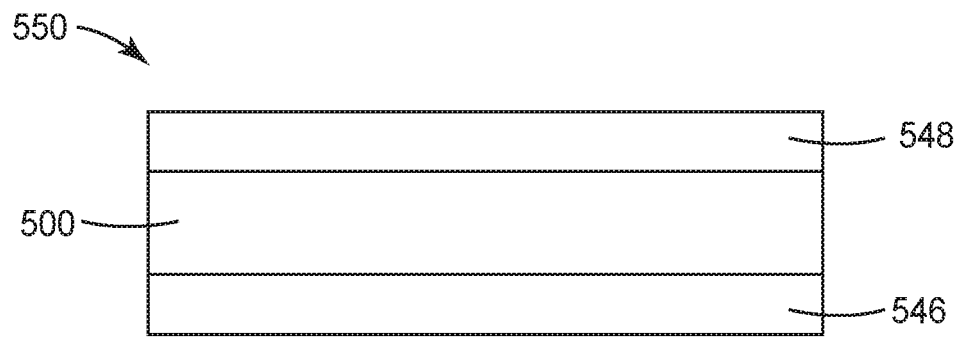
FIG. 5 is a schematic cross-sectional view of a multilayer film.

FIG. 5 is a schematic cross-sectional view of a multilayer film 550 including middle layer 500 disposed between, and bonded to, opposing first and second layers 546 and 548. The middle layer 500 may, for example, correspond to any films described herein that includes elongate polymeric elements interconnecting a plurality of particles. The middle layer 500 may correspond to film 100, for example. In some embodiments, the middle layer 500 is porous and the first and second layers 546 and 548 are non-porous. In some embodiments, the first and second layers 546 and 548 are protective layers (e.g., polymeric films). In some embodiments, one of the first and second layers 546 and 548 is a protective polymeric film and the other of the first and second layers 546 and 548 is an adhesive layer. The adhesive layer may also function as a protective layer.

In some embodiments, a multilayer film 550 includes a porous middle layer 500 disposed between, and bonded to, opposing non-porous first and second protective layers 546 and 548, where the porous middle layer 500 includes a plurality of elongate polymeric elements interconnecting a plurality of hollow particles, and includes a plurality of interconnected voids defined by the pluralities of elongate polymeric elements and hollow particles. In some embodiments, a real part of a dielectric constant of the film 550 at a frequency of about 2.5 GHz (or other frequency or frequency range described elsewhere) is less than about 1.4 or in any range described elsewhere. In some embodiments, a ratio (tan δ) of an imaginary part to the real part of the dielectric constant of the film 550 at the frequency of about 2.5 GHz (or other frequency or frequency range described elsewhere) is less than about 0.004 or in any range described elsewhere. In some embodiments, the particles in the plurality of particles are dispersed in the porous middle layer 500 at a volume loading of greater than about 50 percent or in any range described elsewhere. In some embodiments, a ratio of a volume of the plurality of particles to a volume of the polymeric material in the middle layer 500 is at least 4 or the ratio may be in any of the ranges described elsewhere.

In some embodiments, a film or multilayer film has an elongation at break of at least 3%, or at least 5%, or at least 7%, or at least 10%, or at least 12%, or at least 15% at a tensile load rate of no more than about 5 Newtons per second (e.g., at a rate of 5 N/s or at a rate of 1 N/s) at room temperature (e.g., about 20° C. or about 25° C.).

In some embodiments, a multilayer film 550 includes a middle layer 500 disposed between, and bonded to, opposing first and second protective layers 546 and 548, where the middle layer 500 includes a plurality of hollow particles dispersed therein at a volume loading of greater than about 50 percent. In some such embodiments, the multilayer film has an elongation at break of at least 15% at a tensile load rate of no more than about 5 Newtons per second at room temperature. In some such embodiments, a bending of the multilayer film at a bend location over an inner radius of at most 1.5 mm results in no, or very little, damage to the middle layer at the bend location. Whether or not there is damage to the middle layer at the bend location can be determined by looking at the multilayer film before and after bending the film. The phrase "very little damage to the middle layer" means that the bending resulted in, at most, insignificant cracks that are barely visible in the middle layer.

In some embodiments, the layers 546 and 548 are films (e.g., polyethylene films) laminated to the layer 500. In some embodiments, the layers 546 and 548 are seal layers applied to the layer 500. For example, a seal layer can be applied as some polymer (e.g., acrylate) dissolved in its solvent, or can be applied as a monomer dissolved in its solvent that is later polymerized (e.g., by exposure to UV light or by heat curing), or can be applied by extrusion lamination, for example.

Figure 6:
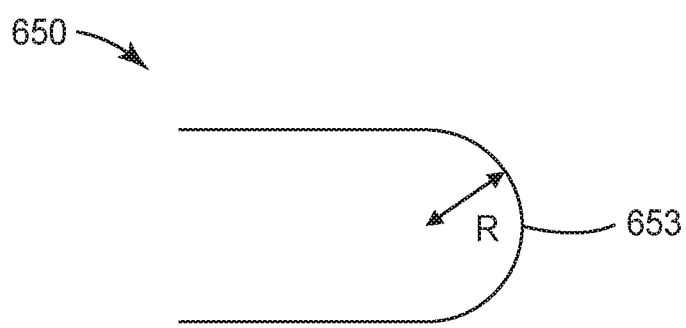
FIG. 6 is a schematic cross-sectional view of a bent film.

FIG. 6 is a schematic cross-sectional view of a film 650 (e.g., corresponding to film 100 or multilayer film 550) bent at a bend location 653 over an inner radius R. In some embodiments, R is at most 1.5 mm.

Figure 7A:
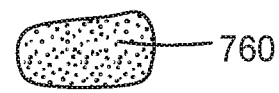
FIGS. 7A-7F schematically illustrate a process for making a film.
Figure 7B:
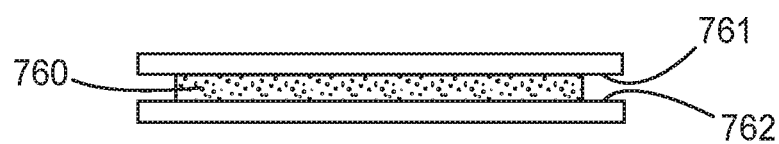
Figure 7C:
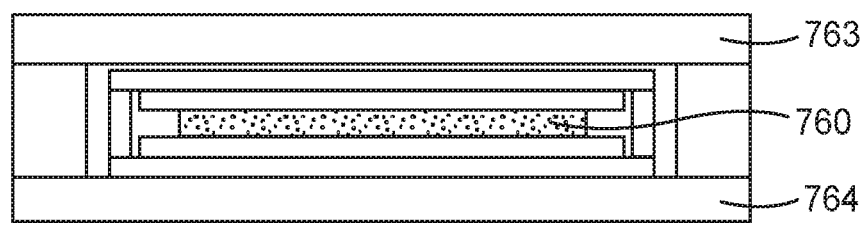
Figure 7D:
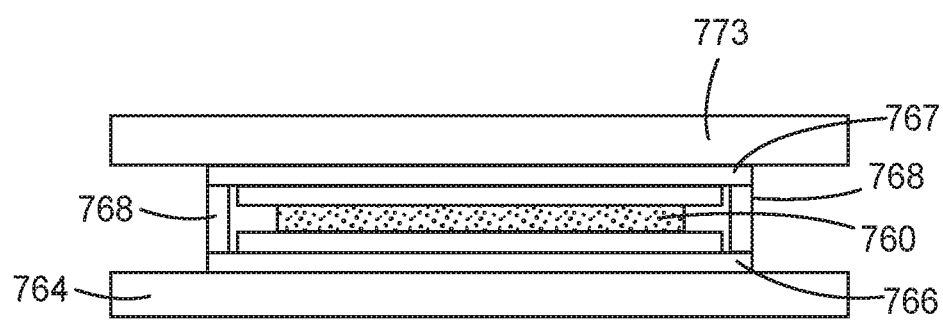
Figure 7E:
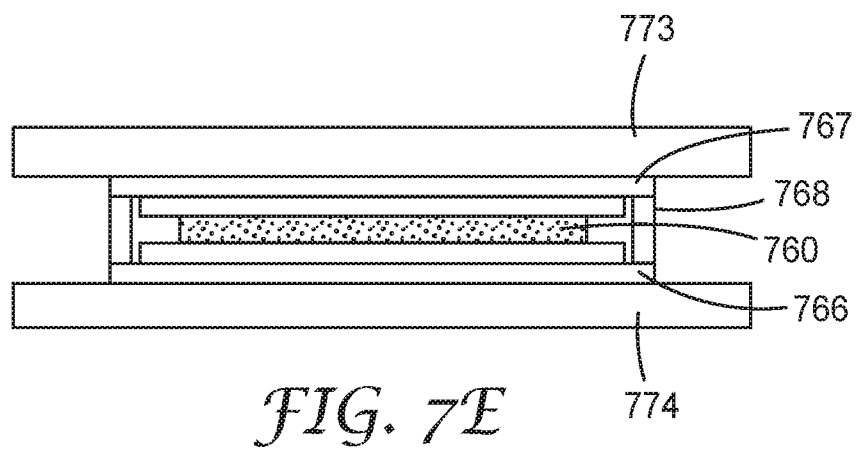
Figure 7F:

FIGS. 7A-7F schematically illustrate a process for making a film. In some embodiments, the process includes providing a mixture 760 at a first temperature (e.g., room temperature). The mixture includes a plurality of particles, a polymer, and a component that is a solvent for the polymer at a higher second temperature but not at a lower first temperature. At the first temperature, the mixture 760 may be described as a slurry. As schematically illustrated in FIG. 7B, the process includes disposing the mixture 760 between first and second release surfaces 761 and 762, which may be surfaces of release films, for example. As schematically illustrated in FIG. 7C, the process includes heating the mixture 760 to the second temperature (e.g., using hot plates 763 and 764 as schematically illustrated in FIG. 7C). The polymer and component then form a miscible polymer-solvent solution and, when included, the plurality of particles is dispersed in the solution. As schematically illustrated in FIG. 7D, the process further includes applying a first pressure (e.g., greater than atmospheric pressure) to the mixture 760. In the illustrated embodiment, the mixture with liners is disposed between additional plates 766 and 767 with spacers 768 used to fix the separation of the plates 766 and 767. As schematically illustrated in FIG. 7E, the process further includes cooling the mixture to induce phase separation of the polymer from the component. In the illustrated embodiments, cooling plates 773 and 774 are utilized. As schematically illustrated in FIG. 7F, the process further includes separating the mixture from at least one of the first and second release surfaces 761 and 762. In the illustrated embodiment, both release surfaces 761 and 762 are removed. For at least a first time interval (e.g., 1 to 10 minutes) prior to cooling the mixture, the mixture is under the first pressure at the second temperature, where the first pressure is sufficiently high to cause the polymer to flow. The appropriate pressure to cause the polymer to flow may depend on the temperature and the molecular weight of the polymer, for example. In some embodiments, the resulting film 700 includes a polymer and a plurality of particles dispersed therein at a volume loading of greater than about 50 percent. In some embodiments, the resulting film has a ratio of a volume of the plurality of particles to a volume of the polymeric material of at least 4 or the ratio may be in any of the ranges described elsewhere.

In some preferred embodiments, the process further includes removing the component, or at least a portion of the component to provide the film. In some embodiments, the film may include the component.

The sequence of steps illustrated in FIGS. 7A-7F may be formed sequentially. In some embodiments, the heating step is carried out prior to the applying the first pressure step and the applying the first pressure step is carried out while the mixture is at the second temperature.

In some embodiments, the step of cooling the mixture to induce phase separation includes cooling the mixture to the first temperature. In some embodiments, cooling the mixture to induce phase separation of the polymer from the component forms elongated polymeric elements such as polymer fibrils as described elsewhere. In some embodiments, the polymer fibrils have an anisotropic distribution of fibril orientation. In some embodiments, each fibril in a subplurality of the polymer fibrils (e.g., a majority of the polymer fibrils) extends generally along an extension direction a at least from a first particle in the plurality of particles to beyond a next nearest neighbor of the first particle along the fibril.

In some embodiments, the particles are frangible and applying the first pressure to the mixture does not crack or break more than 5% of the particles. In some embodiments, a first release liner includes the first release surface 761 and separating the mixture from at least one of the first and second release surfaces includes removing the first release liner.

Figure 8:
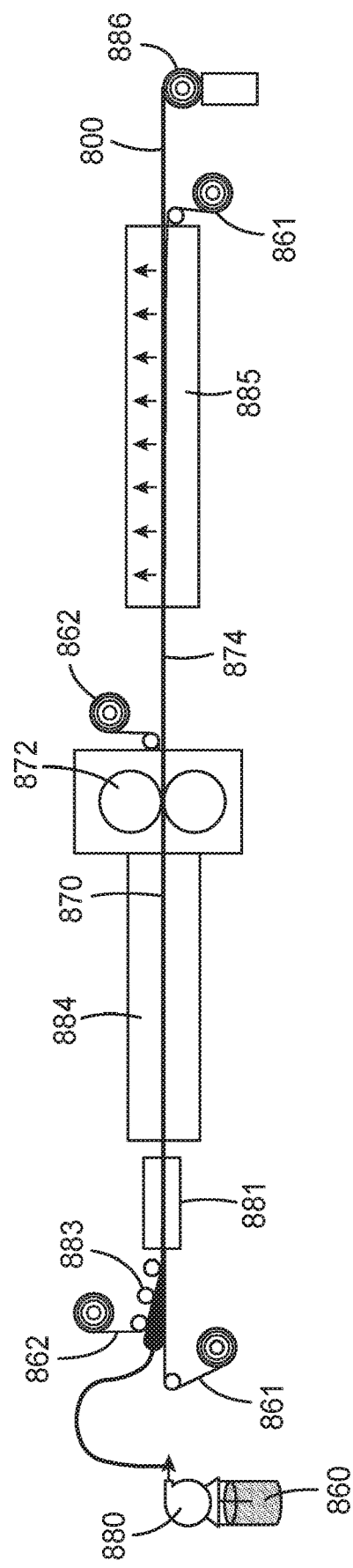
FIG. 8 is a schematic illustration of a process for making film.

FIG. 8 is a schematic illustration of a process for making a film 800. The process includes providing (e.g., in slurry or mixture 860) a plurality of particles, a polymer, and a component that is a solvent for the polymer at a higher second temperature but not at a lower first temperature. The process further includes extruding (e.g., using pump 880) the plurality of particles, the polymer, and the component at the second temperature into a stream 870. In some embodiments, first and second release liners 861 and 862 are provided and gapped nip rollers 883 and an alignment unit 881 are used to form a stream between the release liners 861 and 862, and an oven 884 is used to heat the stream to the second temperature. The process further includes passing the stream 870 through a nip 872 and cooling the stream to the first temperature (e.g., at 874) to induce phase separation of the polymer from the component, where the nip 872 applies pressure to the stream before or during the phase separation. It has been found that when the nip applies before (e.g., just before) or during phase separation, the resulting shear and/or flow patterns in the stream result in elongated polymeric elements (e.g., polymer microfibrils) being formed and substantially aligned as described elsewhere herein. The cooling may occur simply be removing the stream 870 from the oven 884, for example. Alternatively, a chill roll may be used. In some embodiments, the nip 872 includes a chill roll, for example. In some embodiments, the process further includes removing at least one of the liners (e.g., liner 861 as schematically illustrated in FIG. 8) and then removing the component (e.g., via oven drying in oven 885 as schematically illustrated in FIG. 8). In some embodiments, the second liner 862 is then removed to provide the film 800 which may be wound onto a roll 866 of the film 800.

In some embodiments, the film 800 includes a polymer and a plurality of particles dispersed therein at a volume loading of greater than about 50 percent or in any of the ranges described elsewhere. In some embodiments, a ratio of a volume of the plurality of particles to a volume of the polymeric material in the film 800 is at least 4 or the ratio may be in any of the ranges described elsewhere. In some embodiments, protective layers outer layers are added to the film 800 on opposite sides of the film to provide a multilayer film. This can be done in the continuous process of FIG. 8 before winding the film onto roll 866 or can be done in a separate manufacturing process, for example.

In some embodiments, extruding the plurality of particles, the polymer, and the component at the second temperature into a stream includes extruding the stream onto a first release liner 861 and, prior to passing the stream through the nip, applying a second release liner 862 over the stream opposite the first release liner 861. In some embodiments, the process further includes, after the cooling step, removing at least one of the first and second release liners and then removing a least a portion of the component to provide the film.

In other embodiments, the process of FIG. 8 is carried out without including the particles in the slurry or mixture 860. In some embodiments, a process for making a film, which includes a polymer, includes providing a component that is a solvent for the polymer at a second temperature higher than a first temperature and is not a solvent for the polymer at the first temperature; extruding the polymer and the component at the second temperature into a stream; passing the stream through a nip; and cooling the stream to the first temperature to induce phase separation of the polymer from the component such that elongated polymeric elements (e.g., polymer fibrils) having an anisotropic orientation distribution are formed, where the nip applies pressure to the stream before or during the phase separation.

In some embodiments, a process for making a film that includes a plurality of elongate polymeric elements interconnecting a plurality of particles includes providing the plurality of particles, a polymer having a number average molecular weight greater than about $10^4$ g/mol (or in any of the ranges described elsewhere), and a component that is a solvent for the polymer at a higher second temperature but not at a lower first temperature; forming a layer including the plurality of particles dispersed in a miscible solution of the polymer and the component (e.g., in some embodiments, 760 depicted in FIG. 7C or 860 depicted in FIG. 8); and inducing a phase separation of the polymer from the component while the layer is under pressure such that the polymer forms the plurality of elongate polymeric elements (e.g., in some embodiments, the step illustrated in FIG. 7E or passing the stream through the nip 872 as depicted in FIG. 8).

The higher second temperature and lower first temperature referred to in any of the processes described herein may be any suitable temperature where the component is a solvent for the polymer at a higher second temperature but not at a lower first temperature. The first temperature may be room temperature (e.g., 25° C.), for example. The second temperature may be in a range of 60° C. to 200° C., or 80° C. to 160° C., for example.

EXAMPLES

All parts, percentages, ratios, etc. in the examples and the rest of the specification are by weight, unless noted otherwise. The following abbreviations are used herein: RMs=Raw materials, mBar=milli Bar, deg C.=Degree Celsius, mins=minutes, hrs=hours, mg=milligram, N=Newtons, s=seconds, nm=nanometer, kV=kilovolt, nA=nano Amperes, psi=pounds per square inch, N/s=Newtons per second, kPa=Kilo Pascals.

| Abbreviation | Description |
| --- | --- |
| GB32HS | Hollow glass bubbles available from 3M Company, St. Paul, MN as "S32-HS". |
| GBK1 | Hollow glass bubbles available from 3M Company, St. Paul, MN as "K1". |
| Cenosphere | Hollow alumina particles available from CenoStar Corporation, Newburyport, MA as "LS106" |
| UHMWPE | Ultra-high molecular weight polyethylene available from Celanese Corporation, Irving, TX as "GUR-2126". |
| Isopar-G | Paraffin oil available from Brenntag Great Lakes, Inc., Wauwatosa, WI as "ISOPAR G" |
| Liner | A 3-mil (75-micrometer) heat stabilized surface treated polyethylene terephthalate (PET) liner |
| Speed Mixer | A speed mixer available from FlackTek Inc, Landrum, SC available as "Model DAC 600.2 VAC-LR". |
| Analytical Balance | A Laboratory Analytical Balance available from DHAUS Corporation PineBrok, NJ as "Explorer Item #E14130" |
| Notch Bar | Gardco Adjustable Micrometer "Michrom II" film applicator available from Gradco Paul N Gardner Co Inc, Pompano Beach, FL as "AP-99500801" |
| Gaskets | 30 cm x 30 cm Polytetrafluoroethylene glass fiber composite gaskets available cut for 22.86 cm x 22.86 cm opening at the center. |

| Abbreviation | Description |
|---|---|
| Spacers | 25.4 cm × 25.4 cm stainless steel spacer with 21.6 cm × 21.6 cm opening at the center |
| Lab Oven | Solvent rated lab oven available from Despatch, Minneapolis, MN; as "DESPATCH RFD1-42-2E" |
| Hot Press | A hydraulic hot press available from WABASH MPI, Wabash IN, as "Genesis Model 030H-15-LP" |
| TGA | Thermo Galvanometric Analysis Instrument available from TA instruments Wood Dale, IL as "TGA Q500" |
| SEM 1 | Scanning Electron Microscope available from FEI/Thermo Fisher Scientific, Hillsboro, OR as "TENO" |
| SEM 2 | Table Top Microscope available from Hitachi High Technologies, Japan as model "TM3030" |
| FC-43 | A fluorochemical liquid available from 3M Company, St Paul, MN under the trade name "FC-43" |
| Thickness Gauge | A thickness gauge available from Testing Machines, Inc., New Castle, DE as "Model 49-70" |
| Instron | Instron instrument equipped with a 1 kN load cell available from Instron Corporation, Norwood, MA as "Model 5943" |
| Capillary Porometer | Capillary Porometer available from Porous Materials, Inc., Ithaca, NY as "APP-1200-AEX" |
| Micrometer Gauge | A micrometer gauge with a ratchet stop available from Mitutoyo America Corporation, Aurora, IL as "Model #290-240-30" |
| Cylindrical Mandrel | Cylindrical Mandrel Bending Tester available from BYK-Gardner USA Additives Columbia, MD as "Cylindrical Mandrel Bending Tester Cat. No. PF-5710" |
| Dielectric Split Post Resonators | Dielectric split post resonators specifically designed to perform high accuracy measurement of complex dielectric constant available from QWED Company, Warsaw, Poland as "Split Post Resonators" |
| VNA-KS | A vector network analyzer available from Keysight/Agilent Technologies as "PNA Model #E8364C" |
| PX5008 | Acrylic tape available from 3M Company. St Paul MN as "Acrylic Foam Tape PX5008" |
| TPO | Thermoplastic Olefin |
| Microwave Studio | A simulation tool available from CST of America Framingham, MA as Microwave Studio Simulation Tool |

Example 1

4 g of the GB32HS were weighed in a 30 g mixing container using the Analytical Balance. 1.0 gram of UHMWPE was added to the container and the powders were thoroughly hand mixed. 7.65 g of the Isopar-G was added on to the mixed solid powder using a plastic pipette. The solid liquid mix was then loaded onto the Speed Mixture and mixed with the profile shown in Table 1.

TABLE 1

| Step | A | B | C | D | E |
|---|---|---|---|---|---|
| Time (min) | 1 | 1 | 0.5 | 0.25 | 0 |
| RPM | 800 | 1200 | 800 | 0 | 0 |

The uniform mixture of GH32HS, UHMWPE, and Isopar-G was then slightly spread out in an oval shape on an approximately 25.4 cm×20.3 cm Liner laid on to a thick glass plate. A second Liner with the similar dimension was overlaid on top of the oval shaped mixture. The mixture was then spread uniformly along the long axis of oval, between two Liners, along the length using a Notch Bar set at a gap of approximately 0.9 mm. The opening in the Notch Bar was wider than the width of the Liners used so that total thickness of the wet film and the Liner was determined by the gap in the Notch Bar. The film between the Liner was carefully transferred at the center of 30 cm×30 cm Stainless Steel Plate. Four 30 cm×30 cm gaskets each with 207.5 um thickness with a 22.86 cm×22.86 cm opening at the center were overlaid over the Liner with the wet film at the center. A second Stainless Steel Plate was placed over the gaskets. The stack between two Stainless Steel Plates was then transferred on to the bottom platen of the Hot Press. The temperature of the platens was maintained at 135 deg C. The gap between the top and bottom platens of the Hot Press was maintained at 5.5 mm by using paint sticks between them. In this configuration, the top platen did not apply any pressure against the Stainless Steel Plates but created a small heated chamber defined by the thickness of the paint sticks. After allowing the UHMWPE to dissolve at 135 deg C. for 10 mins, the bottom platen was lowered, the paint sticks were removed quickly, the platens were brought together and a pressure of 15 Ton was applied to the Stainless Steel Plates for 5 mins. At this configuration, the gap between the Stainless Steel Plates, and hence the total thickness of molten mass and the Liner, was determined by the total gasket thickness (830 um). After 5 mins, the bottom platen was lowered and the whole stack with the Stainless Steel Plates was transferred to the water chilled platens of the Hot Press and pressed against the weight of the platens for ~2 mins After 2 mins, the stack was removed from the Hot Press, the Liners were removed, and the composite film (formed between two Liners) was dried in room environment by hanging it inside a chemical fume hood for 18 hrs. The films were dried for 30 mins inside the Oven at 90 deg C. to remove any additional residual solvent. The average thickness of the resultant film measured by the Micrometer Gauge at five different places was ~0.6 mm. The process of making the film for Example 1 is schematically depicted in FIGS. 7A-7F.

Example 2

Sample for Example 2 was prepared using the same process as in Example 1 except that 2.501 g of dry GBK1 powder was thoroughly hand mixed with 0.453 g of UHMWPE and 12.374 g of Isopar-G was added. The height of the Notch Bar was increased to 1.44 mm. The Gasket thickness was increased to 1.2 mm by stacking five 207.5 um and one 162.5 um thick Gaskets. The mixing profile used is shown in Table 2. The average thickness of the resultant film measured by the Micrometer Gauge at five different places was ~1.00 mm.

TABLE 2

| Step | A | B | C | D | E |
|---|---|---|---|---|---|
| Time (min) | 1 | 1 | 1.0 | 0.25 | 0 |
| RPM | 800 | 1200 | 800 | 0 | 0 |
| Vacuum (bar) | 50 | 50 | 50 | 50 | 0 |

Example 3

Sample for Example 3 was prepared using the same process as in Example 1 except that 11.0 g of dry Cenosphere powder was thoroughly hand mixed with 1 g of UHMWPE and 15 g of Isopar-G was added. The mixing profile used is shown in Table 2. The average thickness of the resultant film measured by Micrometer Gauge at five different places was ~0.69 mm.

Comparative Example C1

4 g of the GH32HS were weighed in a 30 g mixing container using the Analytical Balance. 1.0 g of UHMWPE was added to the container and the powders were thoroughly hand mixed. On to the mixed solid powder 7.65 g of the Isopar-G was added using a plastic pipette. The solid liquid mix was then loaded onto the Speed Mixture and mixed with the profile shown in Table 1.

The uniform mixture of GH32HS, UHMWPE, and Isopar-G was then slightly spread out in an oval shape on an approximately 25.4 cm×20.3 cm Liners laid on to thick glass plate. A second Liner with the similar dimension was overlaid on top of the oval shaped mixture. The mixture was then spread uniformly, along the long axis of oval, between two Liners along the length using a Notch Bar set at a gap of 0.9 mm. The opening in the Notch Bar was wider than the width of the Liners used so that total thickness of the wet film and the Liner was determined by the gap in the Notch Bar. The wet film between two Liners was gently transferred onto an aluminum pan and put inside an oven at 135 deg C. for 15 mins After 15 mins, the sample was removed from the oven and allowed to quench to room temperature by contacting each side alternatively to the surface of lab bench. After the sample was cooled, two Liners were peeled away and the composite film was dried in ambient environment by hanging in laboratory chemical hood for 18 hrs. The films were dried for 30 mins inside the Oven at 90 deg C. to remove any additional residual solvent. The sample was then cut into two equal halves. One half was used as a Comparative Example C1 and the other half was used as an input material for Comparative Example C2. The average thickness of the resultant films measured by Micrometer Gauge at five different places was ~0.89 mm.

Comparative Example C2

The second half of the sample from the Comparative Example C1 was placed between two 25.4 cm×20.3 cm Liners. The film between the Liners was gently transferred at the center of 30 cm×30 cm Stainless Steel Plate. Four 30 cm×30 cm gaskets each with 207.5 um thickness with a 22.86 cm×22.86 opening at the center was overlaid over the Liner with the wet film at the center. A second Stainless Steel Plate was placed over the gaskets. The stack between two Stainless Steel Plates was then transferred on to the bottom platen of the Hot Press. The platens were maintained at 135 deg C. The gap between the top and bottom platens of the Hot Press was maintained at 5.5 mm by using paint sticks between them. In this configuration, the top platen did not apply any pressure against the Stainless Steel Plates but created a small heated chamber defined by the thickness of the paint sticks. After allowing the UHMWPE to soften at 135 deg C. for 10 minutes, the bottom platen was lowered, the paint sticks were removed quickly, the platens were brought together and a pressure of 15 Ton was applied to the Stainless Steel Plates for 5 mins. At this configuration the gap between the Stainless Steel Plates and hence the total thickness of molten mass and the Liner was determined by the total gasket thickness (830 um). After 5 mins, the bottom platen was lowered and the whole stack with the Stainless Steel Plates are transferred to the water chilled platens of the Hot Press and pressed with just the weight of the platens for ~2 mins After 2 mins, the stack was removed from the Hot Press, the Liners were removed, and the composite film between the Liners was removed. The average thickness of the resultant film measured by Micrometer Gauge at five different places was ~0.63 mm.

Comparative Example C3

Sample for Comparative Example C3 was prepared using the same process as in Comparative Example C1 except that 2.499 g of dry GBK1 powder was thoroughly hand mixed with 0.451 g of UHMWPE and 12.5 g of Isopar-G was added. The height of the Notch Bar was increased to 1.44 mm. The mixing profile used is shown in Table 2. The average thickness of the resultant films measured by the Micrometer Gauge at five different places was ~1.22 mm.

Comparative Example C4

Sample for Comparative Example C4 was prepared using the same process as in Comparative Example C1 except that 11 g of dry Cenosphere powder was mixed with 1.0 g of UHMWPE and 15 g of Isopar-G was added. The height of the Notch Bar was increased to 1.44 mm. The mixing profile used is shown in Table 2. The average thickness of the resultant film measured by Micrometer Gauge at five different places was ~0.72 mm.

Example 4

16.256 g of the GBS32HS were weighed in a 100 g mixing container using the Analytical Balance. 4.064 g of UHMWPE was added to the container and the powders were thoroughly hand mixed. 30.09 g of the Isopar-G was added on to the mixed solid powder using a plastic pipette. The solid liquid mix was then loaded onto the Speed Mixture and mixed using the profile shown in Table 3.

TABLE 3

| Step | A | B | C | D | E |
|---|---|---|---|---|---|
| Time (min) | 0:45 | 0:30 | 0:30 | 0:10 | 0 |
| RPM | 800 | 900 | 1000 | 0 | 0 |
| Vacuum (mbar) | 50 | 50 | 50 | 50 | 1000 |

The uniform mixture of GBS32HS, UHMWPE, and Isopar-G was then slightly spread out in an oval shape on an approximately 25.4 cm×25.4 cm Liner laid on to a thick glass plate. A second Liner with the similar dimension was overlaid on top of the oval shaped mixture. The mixture was then spread uniformly, along the long axis of oval, between two Liners, along the length using the Notch Bar set at a gap of ~2.8 mm. The film between the Liner was gently transferred over the center of a 1 mm thick Spacer. A second 0.6 mm thick Spacer was overlaid over the first one with the Liners between the two. A second Stainless Steel Plate was placed over the second stainless steel spacer. The stack between two Stainless Steel Plates was then transferred on to the bottom platen of the Hot Press. The temperature of the platens was maintained at 135 deg C. The gap between the top and bottom platens of the Hot Press was maintained at 5.5 mm by using paint sticks between them. In this configuration, the top platen did not apply any pressure against the Stainless Steel Plates but created a small heated chamber defined by the thickness of the paint sticks. After allowing the UHMWPE to dissolve at 135 deg C. for 10 mins, the bottom platen was lowered, the paint sticks were removed quickly, the platens were brought together and a pressure of 15 Ton was applied to the Stainless Steel Plates for 5 mins. At this configuration, the gap between the Stainless Steel Plates, and hence the total thickness of molten mass and the Liner, was determined by the total spacer thickness and the thickness of two liners between the spacers. After 5 mins, the bottom platen was lowered and the whole stack with the Stainless Steel Plates was transferred to the water chilled platens of the Hot Press and pressed against the weight of the platens for ~2 mins After 2 mins, the stack was removed from the Hot Press, the Liners were removed, and the composite film was dried in room environment by hanging it inside a chemical fume hood for 18 hrs. The films were dried for 30 mins inside the Oven at 90 deg C. to remove any residual solvent. This gave ~1.75 mm thick film as measured by the Micrometer Gauge.

Example 5

Samples for EXAMPLE 5 were prepared as described in EXAMPLE 4 except that the dry films were laminated between two 40 um thick Polyolefin films using the Laminator with the top roll maintained at ~88 deg C. The gap between two nips rolls was maintained so that the nip rolls were just touching the films as they were laminated without applying excess pressure. The total thickness of the laminated film was ~1.8 mm as measured by the Micrometer Gauge.

Example 6

6.4 g of the GB32HS were weighed in a 30 g mixing container using the Analytical Balance. 1.6 g of UHMWPE was added to the container and the powders were thoroughly hand mixed. 12.24 g of the Isopar-G was added on to the mixed solid powder using a plastic pipette. The solid liquid mix was then loaded onto the Speed Mixture and mixed using the profile shown in Table 1.

The uniform mixture of GB32HS, UHMWPE, and Isopar-G was then slightly spread out in an oval shape on an approximately 25.4 cm×20.3 cm Liner laid on to a thick glass plate. A second Liner with the similar dimension was overlaid on top of the oval shaped mixture. The mixture was then spread uniformly, along the long axis of oval, between two Liners along the length using the Notch Bar set at a gap of approximately 1.44 mm. The opening in the Notch Bar was wider than the width of the Liners used so that total thickness of the wet film and the Liner was determined by the gap in the Notch Bar. The film between the Liner was gently transferred at the center of 30 cm×30 cm Stainless Steel Plate. Five 30 cm×30 cm gaskets each with 207.5 um thickness and one 162.5 um thick Gaskets with a 22.86 cm×22.86 cm opening at the center were overlaid over the Liner with the wet film at the center. A second Stainless Steel Plate was placed over the gaskets. The stack between two Stainless Steel Plates was then transferred on to the bottom platen of the Hot Press. The temperature of the platens was maintained at 135 deg C. The gap between the top and bottom platens of the Hot Press was maintained at 5.5 mm by using paint sticks between them. In this configuration, the top platen did not apply any pressure against the Stainless Steel Plates but created a small heated chamber defined by the thickness of the paint sticks. After allowing the UHMWPE to dissolve at 135 deg C. for 10 mins, the bottom platen was lowered, the paint sticks were removed quickly, the platens were brought together and a pressure of 15 Ton was applied to the Stainless Steel Plates for 5 mins. At this configuration, the gap between the Stainless Steel Plates, and hence the total thickness of molten mass and the Liner, was determined by the total gasket thickness (830 um). After 5 mins, the bottom platen was lowered and the whole stack with the Stainless Steel Plates was transferred to the water chilled platens of the Hot Press and pressed against the weight of the platens for ~2 mins After 2 mins, the stack was removed from the Hot Press, the Liners were removed, and the composite film was dried in room environment by hanging it inside a chemical fume hood for 18 hrs. The films were dried for 30 mins inside the Oven at 90 deg C. to remove any additional residual solvent. This gave ~900 um thick film as measured by the Micrometer.

Example 7

Samples for EXAMPLE 7 were prepared as described in EXAMPLE 6 except that the dry films were laminated between two 40 um thick Polyolefin films using the Laminator with the top roll maintained at ~88 deg C. The gap between two nips rolls was maintained so that the nip rolls were just touching the films as they were laminated without applying excess pressure. The thickness of the laminated film was ~950 um as measured by the Micrometer.

Example 8

Samples for EXAMPLE 8 were prepared as described in EXAMPLE 4 except that dry powders of 6.247 g of GBK1, and 2.006 g of UHMWPE were thoroughly mixed and then 30.658 g of Isopar-G was added in the mixing container. The Notch bar was set at a gap of ~1.42 mm. The resultant films were ~1.4 mm thick as measured by the Micrometer Gauge.

Example 9

Samples for EXAMPLE 9 were prepared as described in EXAMPLE 8 except that the dry films were laminated between two 40 um thick Polyolefin films using the Laminator with the top roll maintained at ~88 deg C. The gap between two nips rolls was maintained so that the nip rolls were just touching the films as they were laminated without applying excess pressure. The thickness of the laminated film was ~1.53 mm as measured by the Micrometer.

Test Methods and Results
1. TGA Tests

Small discs of few millimeter diameter were punched and weighed so that total mass of the 2-3 discs ranged from 5-12 mg. Triplicate samples for each Example 1, Comparative Example C1 and Comparative Example C2 were loaded on the aluminum TGA pans and the temperature was ramped from 35 deg C. to 550 deg C. at a rate of 4 deg C./min in a nitrogen environment. The loss in weight of the sample as a function of temperature was recorded. All three samples showed very similar trend of weight loss as a function of temperature. Table 4 shows the mass loss at 475 deg C. for all three samples. The data shows all samples have similar polymer content.

TABLE 4

| Example | Average Mass Loss (%) |
| --- | --- |
| 1 | 20.03 ± 0.07 |
| C1 | 19.98 ± 0.82 |
| C 2 | 20.35 ± 0.33 |

2. Visual & SEM Tests

Samples were coated with ~10 nm thick gold palladium film before they were loaded on to the stage of the SEM 1. SEM images were taken at 10 kV and 0.4 nA current with different magnifications to glean the uniformity of the samples, distribution of polymer micro fibrils, and the morphology. The same process was used to take SEM images on both sides of each of the samples.

Visually, each of Examples 1-3 had smooth surfaces on both sides with a glossy appearance. The Comparative Examples C1 and C3-C4 had very rough surfaces (some of the particles were attached to the Liners when they were peeled off) and the film of Comparative Example C2 had moderately smooth surfaces.

Macroscopically, SEM images showed that the films from the Example 1 have uniform distribution of the glass bubbles. While there were some small dark spots observed, the glass bubble distribution was very uniform. The film of the Comparative Example C2, had macroscopic pits, some of them as large as 100 um×50 um. The films from Comparative Example C2 still showed some macroscopic pits that were smaller in dimensions and numbers than in Comparative Example C1.

At microscopic level, SEM images showed that the film of Example 1 exhibited a uniform distribution of UHMWPE polymer microfibrils. The polymer microfibrils held the GB32HS particles in the bulk and on the surfaces. The polymer microfibrils also exhibited what appears to be flow induced anisotropic morphology. The magnified SEM images of Comparative Example C1 showed that the glass bubbles were less densely packed. The UHMWPE polymer particles were dissolved in the solvent but in the absence of active mixing/flow there was most likely a localized concentration gradient in the solvent when the phase separation occurred. The resulting polymer phase reflected this local concentration gradient. Consequently, there were localized spots with higher UHMWPE leading to underutilization of polymer available for binding. This led to mechanically weak films or the need for higher polymer content to achieve the same mechanical performance. Binding of the glass bubbles was also non-uniform. This potentially led to transfer of some of the particles to the Liners leaving behind the macroscopic pits described above. The SEM images of Comparative Example C2, showed very different morphology. First, some of the glass bubbles were broken, although the gaskets used for the compression was same as that in preparing Example 1. This indicated that the glass bubbles did not rearrange as well in the UHMWPE matrix as in the slurry of UHMWPE in Isopar-G. This conclusion was also supported by the observation the lateral expansion of the sample was not as high as that of Example 1. Second, the polymer morphology also appeared very different. The polymer microfibrils on the surface of glass bubbles appeared to retract or merge to form larger fibrils or micro-films. While merged polymer fibrils still contributed to the overall mechanical strength of the film, the retreated microfibrils on the glass bubbles did not contribute to binding the glass bubbles leading to mechanically weaker film.

Figure 9:
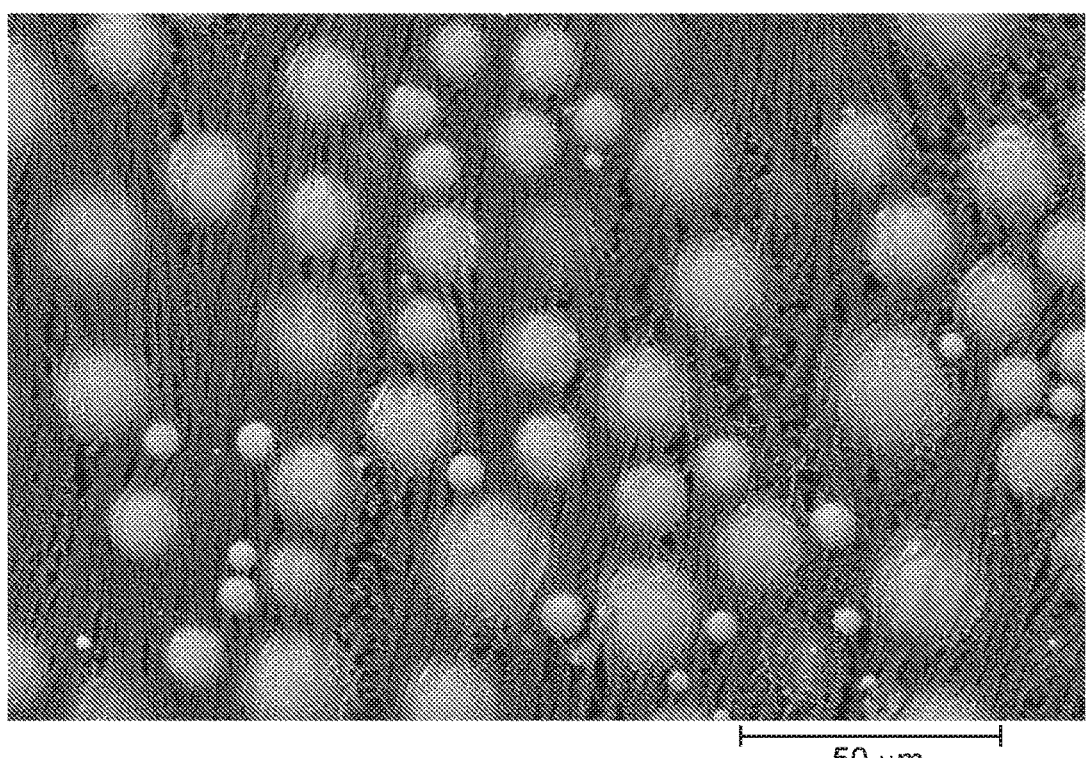
FIGS. 9-10 are scanning electron microscope (SEM) images of portions of a film.
Figure 10:
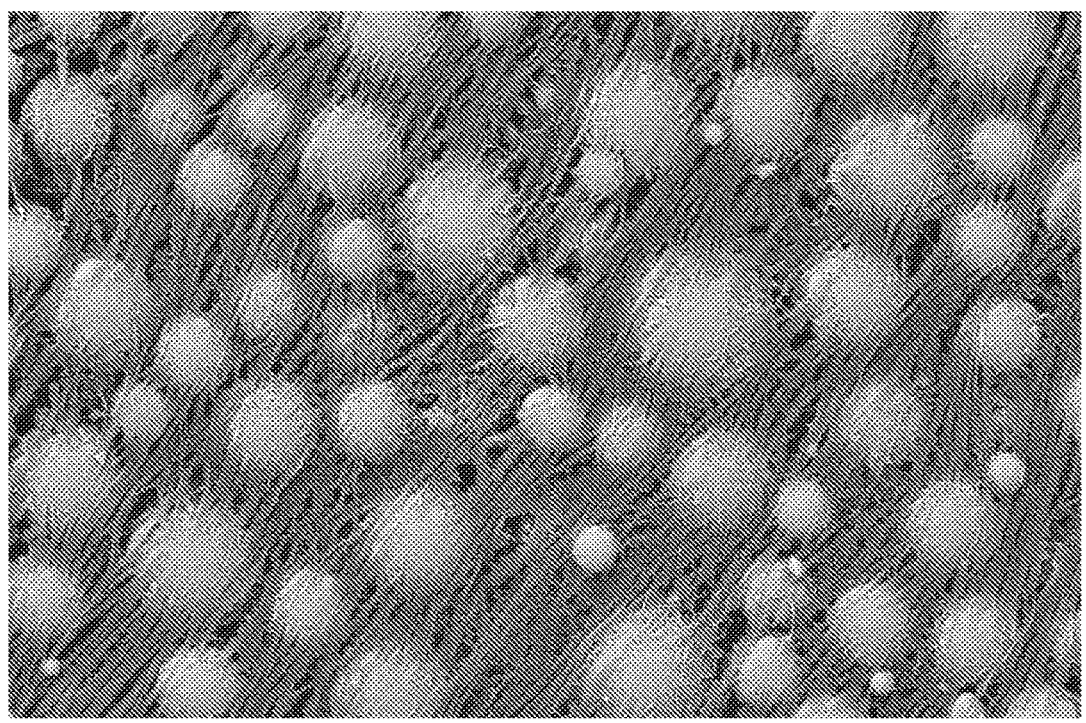

To understand the morphological difference between the Example and Comparative Examples, approximately 4"×6" samples each of Examples 1-3 and Comparative Examples C1, C3, and C4 were analyzed. SEM samples were cut from nine different spots in a 3×3 matrix (eight around the perimeters and one at the center) covering the samples. In all the Examples, a clear anisotropic distribution of polymer fibrils was observed. The fibrils were oriented substantially radially such that in each section of the 3×3 matrix, the fibrils extended in a substantially same direction away from the center section. SEM images from an upper center portion of the 3×3 matrix and from a lower left-hand corner portion of the 3×3 matrix are shown in FIGS. 8 and 9, respectively. The polymer fibrils in the Comparative Examples showed no preferred orientational distribution.

Small 0.5 cm×0.5 cm samples were cut from both Example 4 and Example 5 and mounted on the sample stage of the SEM 2. The optical images of the samples were taken using the SEM operating in EDX mode without any further metal coatings. The SEM images showed that the in the unlaminated film (Example 4) the glass bubbles are held together with the polymer microfibrils. The SEM image of the laminated film, after carefully removing the Polyolefin films, still shows that the glass bubbles were held together by the polymer micro fibrils and the glass bubbles were not broken during the lamination process.

3. Capillary Flow Porometry Test

Capillary Flow Porometry is a commonly used technique to characterize the pore size distribution and largest pore in a porous membrane. A 25 mm diameter disc was cut, the mass was measured using the Analytical Balance. The thickness of the disc was measured using the Thickness Gauge with a dead weight of 50.3 kPa and a flat anvil of 1.6 cm diameter, with a dwell time of about 3 seconds and a resolution of +/−0.0001 inches. The sample was inserted into the Capillary Porometer. The sample was then tested using the default software parameters and running a dry-up/wet-up test from 0-50 psi. A surface energy of 15.6 dynes/cm was used as the surface energy for the wetting fluid. After the dry test was completed, the software prompted to wet the sample. The sample holder was opened and the wetting fluid FC-43 was dispensed onto the sample to fully fill and wet out the pores. The sample holder was then closed, and the wet test continued. The software then summarized the pressure and flow data and reported the bubble point pressure pounds per square inch (psi) as well as the bubble point pore diameter (um). This technique was a modification to ASTM F316-03 (2006), "Standard Test Methods for Pore Size Characteristics of Membrane Filters by Bubble Point and Mean Flow Pore Test,".

The measured bubble point pressure and the bubble point diameter for Example 1, Comparative Example C1, and Comparative Example C2 are shown in Table 5.

TABLE 5

| Example | Bubble Point Pressure (Psi) | Bubble Point Pore Diameter (um) |
|---|---|---|
| 1 | 5.92 | 1.12 |
| C1 | 0.21 | 31.89 |
| C2 | 1.44 | 4.6 |

These Capillary Flow Porometry Test results show that the film from Example 1 had the highest (lowest) bubble point pressure (bubble point diameter) indicating a more uniform small pore distribution in the sample. The Comparative Example C1 prepared using the conventional coating process had the lowest (highest) bubble point pressure (bubble point diameter) which is an indication of largest pores, corroborating the observation from SEM Tests.

4. Tensile Tests

Tensile Tests for Examples 1-3 and Comparative Examples C1-C4

A dog-bone-shaped samples measuring 12.0 cm in length, 2.45 cm in width were die cut from the composite films each of Examples 1-3 and Comparative Examples C1-C4. The narrow section of the sample at the center measured 2.45 cm in length and 1.5875 cm in width. Sample was mounted between two jaws of the Instron instrument that were 5.08 cm apart. With the bottom jaw fixed, the sample was stretched by moving the top jaw while applying a constant force at a rate of 5N/s on the sample until the sample broke and applied load reached a lower threshold of 0.5N. The force required to break the sample was recorded as the Maximum Load and the total extension in the sample was also recorded. Table 6 shows the measured Maximum Force at Breakdown and Extension at Breakdown for the samples studied.

TABLE 6

| Example | Max Force at Breakdown (N) | Extension at Breakdown (%) |
|---|---|---|
| 1 | 6.7 | 4.45 |
| C1 | 9.08 | 1.68 |
| C2 | 4.38 | 1.3 |
| 2 | 8.74 | 4.08 |
| C3 | 8.15 | 1.93 |
| 3 | 30.45 | 4.80 |
| C4 | 26.36 | 2.83 |

Tensile Tests for Examples 6 and 7

Figure 11:
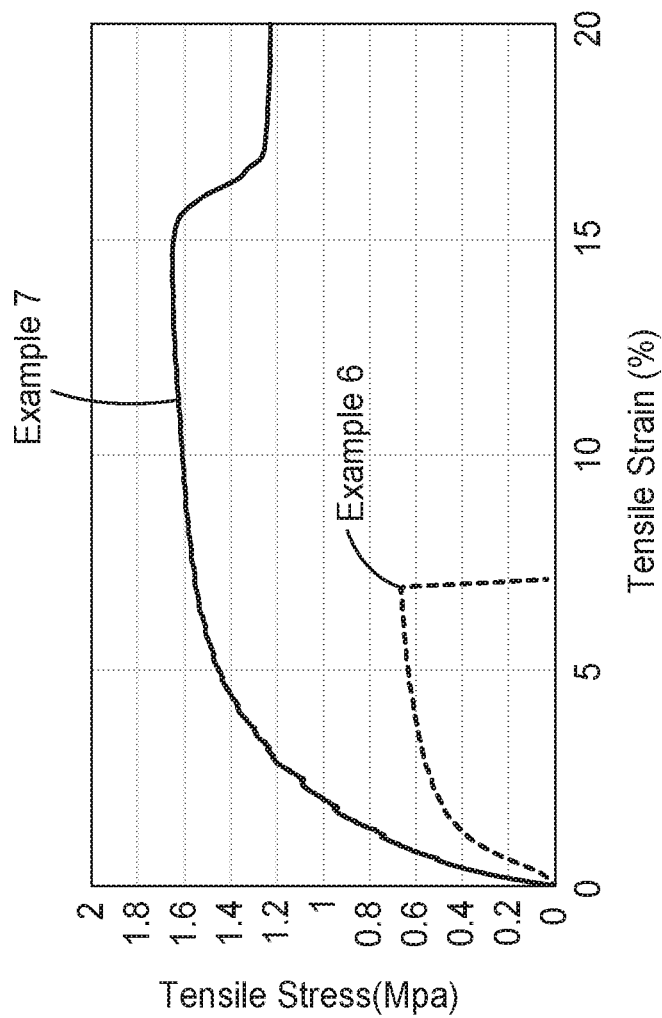
FIG. 11 is a plot of tensile stress versus tensile strain for various films.

A dog-bone-shaped sample measuring 12.0 cm in length, 2.45 cm in width was die cut from the films of Example 6 and Example 7. The narrow section of the sample at the center measured 2.45 cm in length and 1.5875 cm in width. Sample was mounted between two jaws of the Instron instrument that were 5.08 cm apart. With the bottom jaw fixed, the sample was stretched by moving the top jaw while applying a constant force at a rate of 1N/s on the sample until the sample broke and applied load reached a lower threshold of 0.5N. The force required to generate certain extension was recorded as a function of extension. The Tensile Strength was calculated by dividing the force by the cross-sectional area of the sample at the dog-bone and the Tensile Strain was calculated by dividing the extension by the separation between the jaws. FIG. 11 shows the results of the Tensile Test.

The results from the Tensile Test show that the laminated film (Example 7) possessed higher break strength force and higher elongation at break (i.e., better mechanical performance) than the unlaminated film (Example 6).

5. Bend Test

Bend Test for Examples 1-3 and Comparative Examples C1-C4

Bend Test was performed using the Cylindrical Mandrel 4 cm long 2.0 cm wide piece of samples were cut from each of Examples 1-3 and Comparative Examples C1-C4. In place of the Test Panel, a 7.6 cm long, 2.54 cm wide, and 1.5 mm thick glass microscope slide was fixed between the Mandrel and the Bending Piece using the Clamping Jaws so that it extended 0.8 cm toward the Mandrel. At the end of the glass piece, the test sample film was taped along the width with a piece of Kapton tape covering 0.4 cm of the sample films. The top surface of the Bending Piece with the handle in vertically down position was leveled with the top surface of the glass slide while the sample film was gently stretched and snuggly fit between the Mandrel and the Bending Piece. Starting with a 16 mm diameter Mandrel, the test sample was bent around the Mandrel by lifting the Handle quickly through ~180 degrees. The film was visually evaluated for any indication of crakes. The Bending plate was raised away from the Mandrel releasing the test film and the Handle was lowered in vertical position. The Mandrel was replaced with smaller diameter Mandrel and the alignment process was repeated, the same test sample was bent and the mechanical condition of the test sample was recorded. This process was repeated with different Mandrels with diameter ranging from 16 mm to 2 mm and the diameter of the Mandrel when onset of cracking and breaking of the sample occurred was recorded. The process was repeated at least with two samples for each of the Examples.

Bend Test for Examples 4-9

Bend Test was performed using the Cylindrical Mandrel 2.54 cm wide 8.4 cm long pieces were cut from Examples 4 and 5. 10.16 cm long 2.54 cm wide films were cut from Example 6 and 7. To avoid the pressure on the sample from the Clamping jaws, the sample piece was placed under the Clamping Jaws and was secured along the width with a piece of Kapton tape covering ~1 cm of the sample films. The top surface of the Bending Piece with the handle in vertically down position was leveled with the top surface of the clamping surface while the sample film was gently stretched and snuggly fit between the Mandrel and the Bending Piece. Starting with a 16 mm diameter Mandrel, the test sample was bent around the Mandrel by lifting the Handle quickly through ~180 degrees. The film was visually evaluated for any indication of crakes. The Bending plate was raised away from the Mandrel releasing the test film and the Handle was lowered in vertical position. The Mandrel was replaced with smaller diameter Mandrel and the alignment process was repeated, the same test sample was bent and the mechanical condition of the test sample was recorded. This process was repeated with different Mandrels with diameter ranging from 16 mm to 2 mm. The diameter of the Mandrel when onset of cracking and breaking of the sample occurred was recorded. The process was repeated at least with two samples for each of the Examples. The Bend Test results show that film samples that were laminated in between the Polyolefin films showed significant improvement on the bend performance.

The results of the Bending Test are summarized in Table 7.

TABLE 7

| | Mechanical State of the Sample at Mandrel Diameter (mm) | | | | | | | | |
|---|---|---|---|---|---|---|---|---|---|
| Example | 16 | 12 | 10 | 8 | 6 | 5 | 4 | 3 | 2 |
| 1 | N | N | N | N | N | N | N | N | N |
| C1 | N | N | N | N | N | O | O | O | B |
| C2 | N | N | N | N | N | N | O | O | B |
| 2 | N | N | N | N | N | N | N | N | O |
| C3 | N | N | N | N | N | N | O | O | B |
| 3 | N | N | N | N | N | N | N | N | O |
| C4 | N | N | N | N | N | O | O | O | B |
| 4 | N | N | N | N | O | M | M | M | B |
| 5 | N | N | N | N | N | N | N | N | N |
| 6 | N | N | N | N | O | O | M | M | B |
| 7 | N | N | N | N | N | N | N | N | O |

Legend:
N: No Cracks;
O: Crack Onset;
M: Major Cracks;
B: Sample Breaks

6. Complex Permittivity Test

Depending on the frequency range of interest two different permittivity tests were used to measure the permittivity of the glass bubble loaded films prepared with different glass bubbles.

Split Post Resonator (SPR) Permittivity Test:

The Complex Permittivity (Dielectric Constant, and Dielectric Loss Tangent), was measured using two separate Dielectric Split Post Resonators designed specifically for measurements at the two frequencies, 2.5 GHz and 9.5 GHz. These cavities, and the computational software were obtained from the QWED Company, Warsaw, Poland. The resonant band width, and resonant frequency of the appropriate cavity resonance (defined by the nominal cavity frequency) were both accurately measured with each cavity with the magnitude of the Transmission S-parameter defined as $S_{21}$ and without the sample inserted (four measurements). These electronic measurements of $S_{21}$ were each performed using two port measurements using the VNA-KS. Using the four electronics measurements and sample thickness measurement described above, the complex permittivity was calculated with the QWED software at each frequency for each cavity.

Free Space Permittivity Test:

A simple five-space measurement system designed and built by Thomas Keating Ltd (Billingshurst, United Kingdom) was implemented to measure the permittivities of the samples at high frequencies. This free space system was combined with vector network analyzer (VNA) and analysis software to enable determination of complex material properties, including Transmission of Power through a material at any angle between 0 degrees and 60 degrees incidence. This system from Thomas Keating is a 60-90 GHz Quasi-Optic system, i.e., where the sizes of the optical components are small with respect to the wavelength thereby requiring the use of geometrical optics to design such systems.

The Keysight VNA hardware is a "zero gain" circuit whereby a Gaussian beam waist at the aperture of a corrugated feed horn connected to one port is refocused by an ellipsoidal mirror to form a beam waist at the sample position and then is passed, via a second mirror, to a second port, where a second corrugated feed horn feed the beam into the VNA waveguide. For the measurements, a PNA-KS was used for the Transmission and Reflection measurements directly, as the normalized power associated with the complex S-Parameters $S_{21}$ and $S_{11}$. The computation of the complex permittivity (dielectric constant and dielectric loss) from the complex S-Parameters $S_{21}$ and $S_{11}$ was performed using the Keysight analysis software that uses the standard NIST (National Institute of Standard and Technology) method as described in NIST Technical Note 1355R.

Measured permittivities of various samples at different frequencies at the corresponding test methods are shown in Table 8.

TABLE 8

| Glass Bubble Type | Example | Frequency (GHz) | Test Method | ε' | ε" | Tanδ |
|---|---|---|---|---|---|---|
| S32HS | 1 | 2.5 | SPR | 1.31 | 0.0033 | 0.0025 |
| | 1 | 9.5 | SPR | 131 | 0.0033 | 0.0025 |
| | C1 | 2.5 | SPR | 1.24 | 0.0026 | 0.0021 |
| | C1 | 9.5 | SPR | 1.24 | 0.0026 | 0.0021 |
| | C2 | 2.5 | SPR | 1.34 | 0.0035 | 0.0026 |
| | C2 | 9.5 | SPR | 1.34 | 0.0035 | 0.0026 |
| | 4 | 2.5 | SPR | 1.31 | 0.0024 | 0.0019 |
| | 6 | 2.5 | SPR | 1.30 | 0.0017 | 0.0013 |
| | 6 | 9.5 | SPR | 1.30 | 0.0017 | 0.0013 |
| | 5 | 2.5 | SPR | 1.34 | 0.0024 | 0.0018 |
| | 5 | 60 | Free Space | 1.35 | <0.01 | <0.01 |
| K1 | 8 | 5.6 | SPR | 1.15 | 0.0016 | 0.0014 |
| | 8 | 60 | Free Space | 1.16 | <0.01 | <0.01 |
| | 9 | 5.6 | SPR | 1.19 | 0.0013 | 0.0011 |
| | 9 | 60 | Free Space | 1.2 | <0.01 | <0.01 |
| None | Polyolefin Film | 2.5 | SPR | 2.3 | 0.0026 | 0.0012 |

Figure 12:
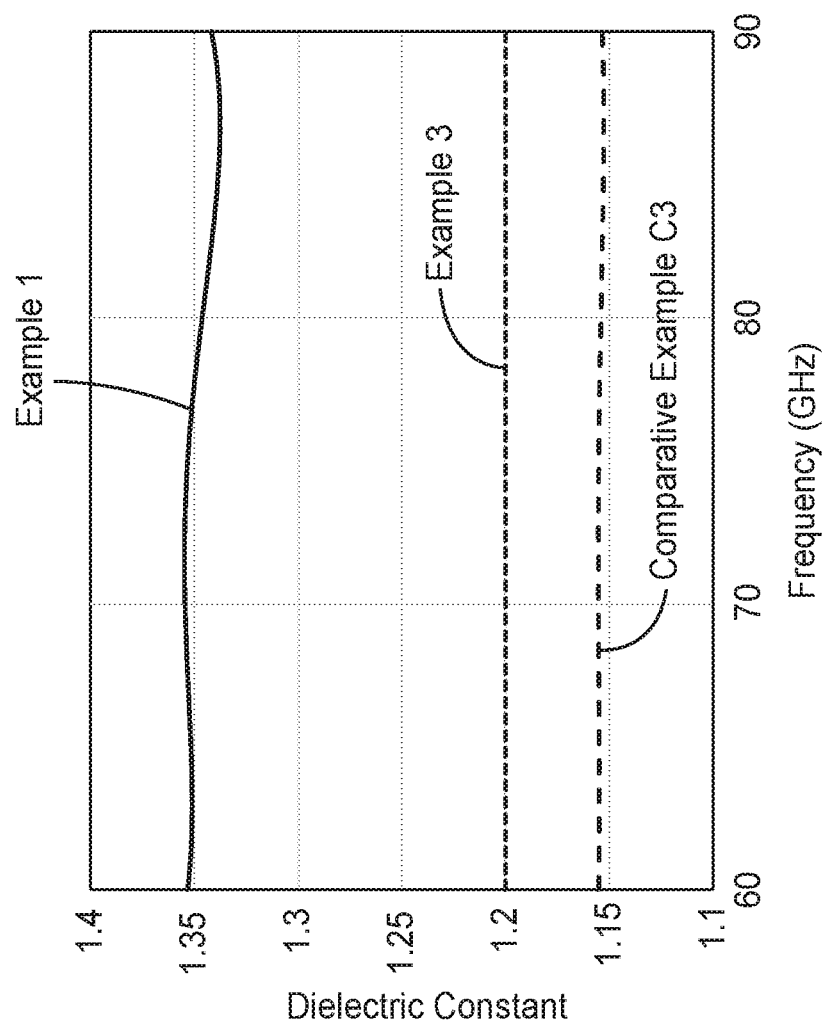
FIG. 12 is a plot of the dielectric constant of various film versus frequency.

The variation of the dielectric constant over the frequency range of 60-90 GHz as measured by the Free Space Permittivity Test Method is shown in FIG. 12.

The results from Complex Permittivity Test show that the dielectric constant and the dielectric loss of a laminated sample were very low and were similar to those of the unlaminated sample.

Transmission Loss Test:

To demonstrate the potential application of the low dielectric constant, low loss material in high frequency electromagnetic applications, the scattering parameters or S-parameters were measured inside an anechoic chamber with two horn antennas mounted 400 mm apart on center of a precision optical slide mount. A rotational sample stage was mounted on the optical rail in between two antennas so that its position relative to antenna can be varied. The Source Module and the Receive Module were used to drive the source antenna and receiver antenna, respectively. A copper plate with a 50 mm×50 mm aperture was mounted on the sample holder in between two antennas. The sample was held flush to copper plate with mounting screws and plastic bars to serving as a clamp. The distance of the sample from the source antenna and the orientation of the sample with respect to axis of the optical rail were varied. A high frequency electromagnetic signal was fed to The Source Module from the VNA-RS. The transmitted signal received by the receiver antenna was filtered through the Receive Module before it got fed to the VNA-RS. The reflected and transmitted signals were then recorded at normal incidence when the sample was at 200 mm away from the source antenna. After equilibration of the equipment against thermal fluctuations, air measurement (i.e., no sample) was taken at each position/angle combination for reference and was subtracted from the data sets from the actual samples. The data was collected to provide information on the $S_{21}$ parameter (transmission coefficient) of the signal at the air sample interface. Three samples were prepared using TPO (thickness of 3.0 mm, ε' of 2.46), PX5008 (thickness of 0.8 mm, ε' of 2.04) and the Glass Bubble films (Example 1 and Example 2) as shown in Table 9 to test the effectiveness of the films prepared using the process described above in suppressing early reflections of automotive RADAR signal at the bumper, for example:

TABLE 9

| Example | Layer 1 | Layer 2 | Layer 2 |
|---|---|---|---|
| Control | TPO | N/A | N/A |
| Sample 1 | TPO | PX5008 | Example 1 |
| Sample 2 | TPO | PX5008 | Example 2 |

Figure 13:
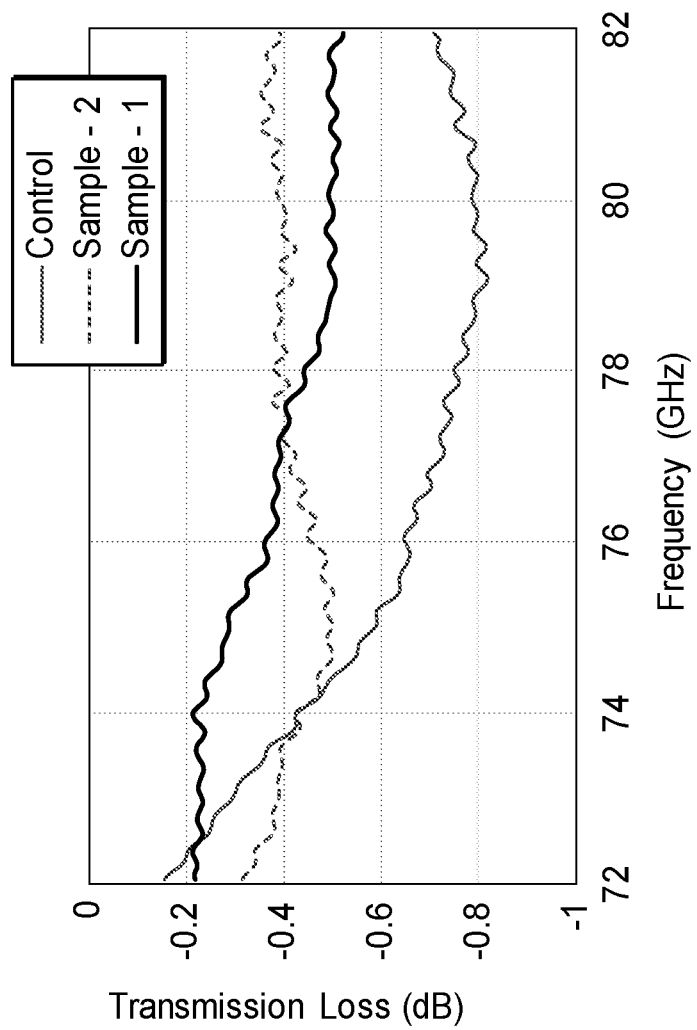
FIG. 13 is a plot of measured transmission loss through various structures.

The measured Transmission Loss as a function of frequency in the 77 GHz band (76-81 GHz) used for automotive RADAR is shown in FIG. 13. These results show that the transmission loss for TPO alone, a plastic material that is commonly used for bumpers in automobiles, is highest in the 77 GHz band. Since the change in the permittivity going from TPO to air high, due to the early reflections at the bumper air interfaces the transmission intensity also shows fringes (ripples) with high amplitudes. These fringes are responsible for "ghost images" of the intended object in front of the RADAR. In the same frequency range, when a three-layered structure formed by combining TPO with PX5008 and a film from Example 1 or Example 2 was used, the transmission loss was reduced. Moreover, the amplitudes of early reflection fringes in the transmission curves were reduced when a film of Example 1 was applied to TPO. These results show that the (e.g., low dielectric constant, low loss) films described herein can be advantageously used as one of the layers in the multilayered structure of bumper material used in front of automotive RADAR.

Figure 14:
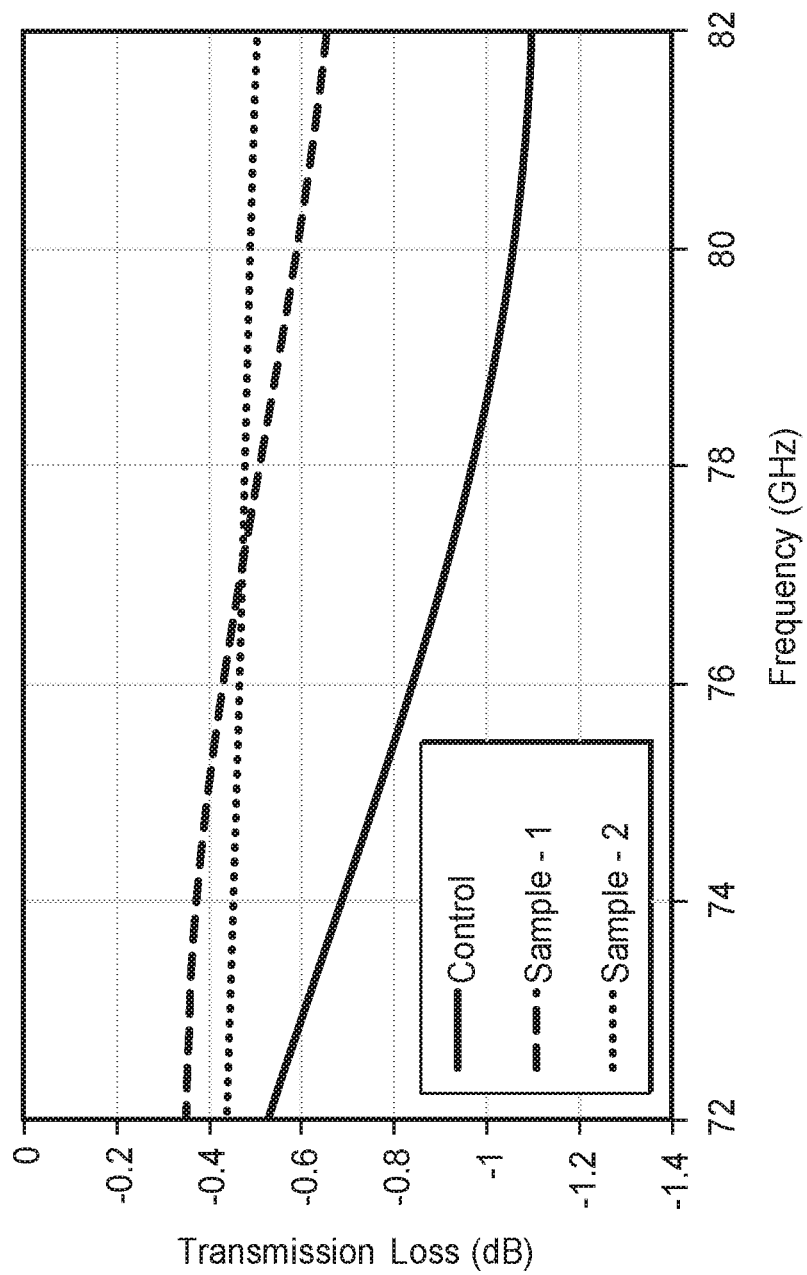
FIG. 14 is a plot of calculated transmission loss through various structures.
Figure 15:
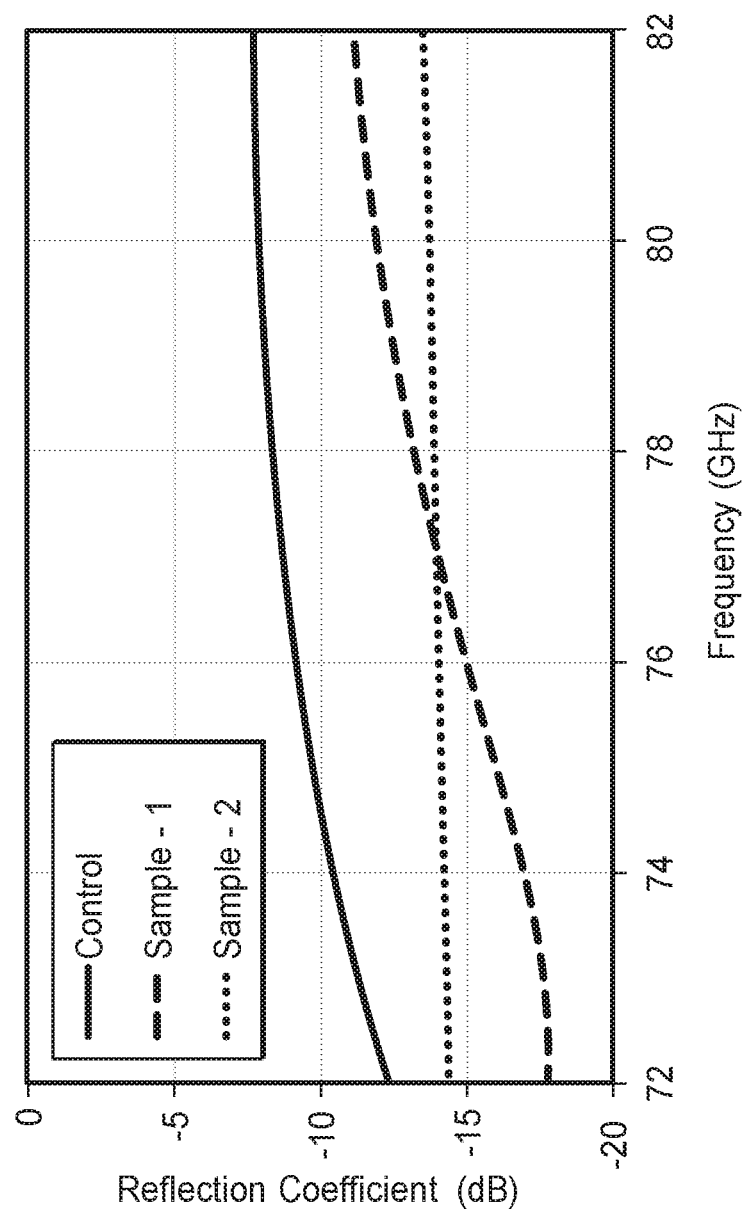
FIG. 15 is a plot of calculated reflection coefficient from various structures.

EM Modeling Calculation on Transmission/Reflection Loss:

EM (Electromagnetic) modeling on transmission and return loss was carried out using the Microwave Studio Simulation Tool. The same samples described above, Control, Sample 1 and Sample 2, were modeled to calculate transmission and return loss. The resulting transmission loss is shown in FIG. 14 and the resulting reflection coefficient is shown in FIG. 15. The measurement and modeling results on transmission loss are consistent as can be seen from FIGS. 13 and 14. Sample 2 showed the most preferred performance at the interested frequency range for the RADAR application. The thickness of the glass bubble film (i.e., the thickness of the Example 2 film) used in Sample 2 structure was optimized and calculated using EM the Microwave Studio Simulation Tool. The transmission loss plot of FIG. 14 shows the minimized variation which means the example film on top of TPO can minimize the reflection from the interface between TPO and air over the frequency range of interest. FIG. 16 shows the $S_{11}$ (Reflection coefficient) calculation results. The control sample had the highest reflection variation depending on frequency and Sample 1 had less variation than the control sample. Sample 2 showed the lowest reflection variation from 72 to 82 GHz through individual layer structure optimization (e.g., thicknesses and refractive indices) using CST Microwave studio modeling tool. This broadband characteristic of Sample 2 can provide tolerance for the permittivity and thickness variation of bumper materials. Therefore, the example film can provide more freedom of bumper material/thickness selection and manufacturing tolerance.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A film comprising a polymeric material and a plurality of particles dispersed therein, the polymeric material comprising a plurality of elongate polymeric elements oriented along substantially a same first direction and interconnecting the particles, an elongate end portion of at least a first elongate polymeric element in the plurality of elongate polymeric elements conforming and bonded to a first particle in the plurality of particles along an entire length of the elongate end portion, an elongate mid portion of at least a second elongate polymeric element in the plurality of elongate polymeric elements conforming and bonded to a second particle in the plurality of particles along an entire length of the elongate mid portion with the second elongate polymeric element extending away from the second particle from opposite ends of the elongate mid portion.

2. The film of claim 1, wherein the particles in the plurality of particles are dispersed in the polymeric material at a volume loading of greater than about 50 percent.

3. The film of claim 1, wherein the particles in the plurality of particles are hollow and have an average size greater than about 1 micron.

4. A film comprising a polymeric material and a plurality of particles dispersed therein at a volume loading of greater than about 50 percent, the polymeric material comprising a plurality of elongate polymeric elements interconnecting the particles, each elongate polymeric element in a sub-plurality of elongate polymeric elements in the plurality of elongate polymeric elements comprising a plurality of spaced apart elongate portions, each elongate portion in the plurality of spaced apart elongate portions conforming and bonded to a particle in the plurality of particles along an entire length of the elongate portion with the polymeric element extending away from the particle from opposite ends of the elongate portion.

5. The film of claim 4, wherein the plurality of spaced apart elongate portions comprises at least three elongate portions.

6. The film of claim 4, wherein a ratio of a volume of the plurality of particles to a volume of the polymeric material is at least 5.

7. A multilayer film comprising a porous middle layer disposed between, and bonded to, opposing non-porous first and second protective layers, the porous middle layer comprising:
- a plurality of elongate polymeric elements interconnecting a plurality of hollow particles; and
- a plurality of interconnected voids defined by the pluralities of elongate polymeric elements and hollow particles, wherein a real part of a dielectric constant of the film at a frequency of about 2.5 GHz is less than about 1.4.

8. The multilayer film of claim 7, wherein a ratio of an imaginary part to the real part of the dielectric constant of the film at the frequency of about 2.5 GHz is less than about 0.004.

9. The multilayer film of claim 7, wherein the particles in the plurality of particles are dispersed in the porous middle layer at a volume loading of greater than about 50 percent.

10. A multilayer film comprising a middle layer disposed between, and bonded to, opposing first and second protective layers, the middle layer comprising a plurality of elongate polymeric elements interconnecting a plurality of particles, for at least a pair of first and second particles in the plurality of particles and for each elongate polymeric element in a sub-plurality of elongate polymeric elements in the plurality of elongate polymeric elements, a first end of the element terminates at the first particle and an opposing second end of the element terminates at the second particle.

11. The multilayer film of claim 10, wherein the elongate polymeric elements in the sub-plurality of elongate polymeric elements are substantially parallel with each other.

12. A multilayer film comprising a middle layer disposed between, and bonded to, opposing first and second layers, the middle layer comprising a plurality of hollow particles dispersed therein at a volume loading of greater than about 50 percent, the multilayer film having an elongation at break of at least 15% at a tensile load rate of no more than about 5 Newtons per second at room temperature, wherein a bending of the multilayer film at a bend location over an inner radius of at most 1.5 mm results in no, or very little, damage to the middle layer at the bend location.

13. A process for making the film of claim 1, the process comprising:
- providing a mixture at a first temperature, the mixture comprising the plurality of particles, a polymer, and a component that is a solvent for the polymer at a higher second temperature but not at a lower first temperature;
- disposing the mixture between first and second release surfaces;
- heating the mixture to the second temperature;
- applying a first pressure to the mixture;
- cooling the mixture to induce phase separation of the polymer from the component, the phase separated polymer forming the polymeric material comprising the plurality of elongate polymeric elements; and
- separating the mixture from at least one of the first and second release surfaces, wherein for at least a first time interval prior to cooling the mixture, the mixture is under the first pressure at the second temperature, the first pressure being sufficiently high to cause the polymer to flow.

14. A process for making the film of claim 1, the process comprising:
- providing the plurality of particles, a polymer, and a component that is a solvent for the polymer at a higher second temperature but not at a lower first temperature;
- extruding the plurality of particles, the polymer, and the component at the second temperature into a stream;
- passing the stream through a nip; and
- cooling the stream to the first temperature to induce phase separation of the polymer from the component, the nip applying pressure to the stream before or during the phase separation, the phase separated polymer forming the polymeric material comprising the plurality of elongate polymeric elements.

15. A process for making the film of claim 1, the process comprising:
- providing the plurality of particles, a polymer having a number average molecular weight greater than about $10^4$ g/mol, and a component that is a solvent for the polymer at a higher second temperature but not at a lower first temperature;
- forming a layer including the plurality of particles dispersed in of a miscible solution of the polymer and the component; and
- inducing a phase separation of the polymer from the component while the layer is under pressure such that the polymer forms the plurality of elongate polymeric elements.

* * * * *